(12) United States Patent
Jassal et al.

(10) Patent No.: US 11,800,522 B2
(45) Date of Patent: Oct. 24, 2023

(54) SYSTEM AND METHOD FOR REPORTING IN RESPECT OF MULTIPLE DOWNLINK ASSIGNMENTS FROM MULTIPLE TRANSMIT RECEIVE POINTS

(71) Applicants: Aman Jassal, Kanata (CA); Yicheng Lin, Ottawa (CA); Hamidreza Farmanbar, Ottawa (CA); Mohammadhadi Baligh, Ottawa (CA); Hua Xu, Ottawa (CA)

(72) Inventors: Aman Jassal, Kanata (CA); Yicheng Lin, Ottawa (CA); Hamidreza Farmanbar, Ottawa (CA); Mohammadhadi Baligh, Ottawa (CA); Hua Xu, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 206 days.

(21) Appl. No.: 16/136,964

(22) Filed: Sep. 20, 2018

(65) Prior Publication Data
US 2020/0100239 A1 Mar. 26, 2020

(51) Int. Cl.
*H04W 72/21* (2023.01)
*H04L 1/1812* (2023.01)
(Continued)

(52) U.S. Cl.
CPC .......... *H04W 72/21* (2023.01); *H04L 1/0026* (2013.01); *H04L 1/1812* (2013.01);
(Continued)

(58) Field of Classification Search
CPC .......... H04W 72/0413; H04W 72/046; H04W 72/14; H04W 72/0446; H04W 24/10;
(Continued)

(56) References Cited

U.S. PATENT DOCUMENTS

| 2018/0034526 A1* | 2/2018 | Lee ........................ H04W 24/10 |
| 2019/0045490 A1* | 2/2019 | Davydov .............. H04L 5/0044 |

(Continued)

FOREIGN PATENT DOCUMENTS

| CN | 102158326 A | 8/2011 |
| CN | 102474465 A | 5/2012 |

(Continued)

OTHER PUBLICATIONS

Kundu et al., U.S. Appl. No. 62/654,000, filed Apr. 6, 2018 (Year: 2018).*

(Continued)

*Primary Examiner* — Yu-Wen Chang

(57) ABSTRACT

Systems and methods of transmitting and receiving combined uplink control information (UCI) in respect of downlink assignments are provided. The UE is configured to combine certain UCI based on a property of downlink assignment, such as PDCCH ID, beam information, CORESET. The UE may also be configured to determine which UCI having the same value of the property of downlink assignment to combine. This can be based on a value-specific monitoring window or a monitoring window that is common to multiple values of the assignment property.

25 Claims, 13 Drawing Sheets

(51) Int. Cl.
*H04L 5/00* (2006.01)
*H04L 1/00* (2006.01)
*H04W 72/0446* (2023.01)
*H04W 72/044* (2023.01)
*H04W 24/10* (2009.01)
*H04W 76/11* (2018.01)
*H04W 72/23* (2023.01)

(52) U.S. Cl.
CPC .......... *H04L 5/0055* (2013.01); *H04W 24/10* (2013.01); *H04W 72/046* (2013.01); *H04W 72/0446* (2013.01); *H04W 72/23* (2023.01); *H04W 76/11* (2018.02)

(58) Field of Classification Search
CPC .... H04W 76/11; H04L 1/0026; H04L 1/1812; H04L 5/0055
See application file for complete search history.

(56) References Cited

U.S. PATENT DOCUMENTS

| | | | | |
|---|---|---|---|---|
| 2019/0090261 A1* | 3/2019 | Yang | | H04W 76/27 |
| 2019/0199477 A1* | 6/2019 | Park | | H04L 1/0067 |
| 2019/0208506 A1* | 7/2019 | Baldemair | | H04L 1/1614 |
| 2019/0222400 A1* | 7/2019 | Bagheri | | H04L 1/0068 |
| 2019/0239216 A1* | 8/2019 | Kundu | | H04L 5/0044 |
| 2019/0335534 A1* | 10/2019 | Atarius | | H04W 80/10 |
| 2019/0349147 A1* | 11/2019 | Aiba | | H04L 1/1887 |
| 2020/0015250 A1* | 1/2020 | Yang | | H04W 72/569 |
| 2020/0029310 A1* | 1/2020 | Lee | | H04W 72/23 |
| 2020/0037305 A1* | 1/2020 | Yang | | H04L 5/0035 |
| 2020/0037314 A1* | 1/2020 | Xiong | | H04L 5/0091 |
| 2020/0045700 A1* | 2/2020 | Sun | | H04L 5/0091 |
| 2020/0045720 A1* | 2/2020 | Abdel Shahid | | H04W 72/1268 |
| 2020/0092727 A1* | 3/2020 | Basu Mallick | | H04L 1/0061 |
| 2020/0196343 A1* | 6/2020 | Marinier | | H04L 5/001 |
| 2021/0075558 A1* | 3/2021 | Takeda | | H04L 1/1614 |
| 2021/0153188 A1* | 5/2021 | Wang | | H04L 5/0051 |
| 2021/0320764 A1* | 10/2021 | Gao | | H04W 72/542 |

FOREIGN PATENT DOCUMENTS

| | | |
|---|---|---|
| WO | 2017171299 A1 | 10/2017 |
| WO | 2018141246 A1 | 8/2018 |

OTHER PUBLICATIONS

3rd Generation Partnership Project; Technical Specification Group Radio Access Network; NR; Multiplexing and channel coding (Release 15); 3GPP TS 38.212 V15.0.0 (Dec. 2017).

3rd Generation Partnership Project; Technical Specification Group Radio Access Network; NR; Physical layer procedures for control (Release 15); 3GPP TS 38.213 V15.0.0 (Dec. 2017).

"RAN1 Chairman's Notes", 3GPP TSG RAN WG1 Meeting #90, Prague, Czech Republic, Aug. 21-25, 2017.

Samsung Combined CR of all essential corrections to 38.213 from RAN1#94bis and RAN1#95 3GPP TSG RAN WGI Meeting #95 R1-1814394, Nov. 12, 2018, , total 113 pages.

Ericsson TP on sTTI terminology 36.213 3GPP TSG-RAN WG1 Meeting #92 Tdoc R1-1802929, Feb. 26, 2018, total 225 pages.

InterDigital, Inc., URLLC UCI prioritization; 3GPP TSG RAN WGI Meeting #93, Busan, Korea, May 21-25, 2018, R1-1806963, 3 pages.

* cited by examiner

SYSTEM AND METHOD FOR REPORTING IN RESPECT OF MULTIPLE DOWNLINK ASSIGNMENTS FROM MULTIPLE TRANSMIT RECEIVE POINTS

TECHNICAL FIELD

The present disclosure relates generally to wireless communications, and in particular, to systems and methods for reporting in respect of multiple downlink assignments from multiple transmit receive points (TRP).

BACKGROUND

In traditional cellular networks, each transmit/receive point is associated with a coverage area or a traditional TRP-based cell and is assigned a traditional cell identifier (ID) to define the control channel and data channel so that simultaneous TRP to user equipment (UE) or UE to TRP communications can be supported for each traditional cell. The network may maintain the association between serving TRP and the UE through assigned traditional cell ID until a handover is triggered.

Each TRP can transmit an assignment of resources that will be used when transmitting to the UE or receiving from the UE. For example, a TRP can transmit information on a downlink control channel indicating to the UE where in a downlink shared channel data may be located for the UE.

SUMMARY

According to one aspect of the present disclosure, there is provided a method in a user equipment (UE), the method comprising: receiving a plurality of downlink assignments, each downlink assignment associated with a value of an assignment property; for each of at least two values of the assignment property, transmitting a respective combined uplink control information (UCI) containing UCI in respect of each of at least two of the plurality of downlink assignments associated with the value of the assignment property.

Optionally, the assignment property is physical downlink control channel (PDCCH) identity or control resource set (CORESET) identity or beam information or radio network temporary identifier, or configurable UE identifier, or higher-layer sublayer, or HARQ entity, or demodulation reference symbol configuration.

Optionally, for each of at least two values of an assignment property, transmitting a respective combined uplink control information (UCI) containing UCI in respect of each of at least two of the plurality of downlink assignments associated with the value of the assignment property comprises: transmitting the respective combined uplink control information (UCI) on a respective physical uplink control channel (PUCCH) associated with the value of the assignment property.

Optionally, for each of at least two values of the assignment property, transmitting a respective combined uplink control information (UCI) containing UCI in respect of each of at least two of the plurality of downlink assignments associated with the value of the assignment property comprises: for each of the at least two values of the assignment property: monitoring for downlink assignments associated with the value of the assignment property that are received during a respective monitoring window; and transmitting the respective combined UCI in respect of downlink assignments associated with the value of the assignment property that are received during the respective monitoring window.

Optionally, the method comprises: for each of the at least two values of the assignment property, receiving a configuration of the respective monitoring window that configures, based on a granularity, one or a combination of: the assignment property that the monitoring window applies to; start; end; duration; offset; and periodicity.

Optionally, for each of at least two values of the assignment property, transmitting a respective combined uplink control information (UCI) containing UCI in respect of each of at least two of the plurality of downlink assignments associated with the value of the assignment property comprises: monitoring for downlink assignments that are received during a monitoring window; for each of the at least two values of the assignment property, transmitting the respective combined UCI in respect of downlink assignments associated with the value of the assignment property that are received during the monitoring window.

Optionally, the method comprises: receiving a configuration of the monitoring window that configures, based on a granularity, one or a combination of: a list of values of the assignment property that the monitoring window applies to; start; end; duration; offset; and periodicity.

Optionally, the method further comprises: for each of the at least two values of the assignment property, transmitting the respective combined UCI by transmitting the respective combined UCI during a reporting window containing a plurality of reporting occasions; wherein the plurality of reporting occasions comprises, for each at least two values of the assignment property, a respective set of at least one reporting occasion that is available to transmit the combined UCI in respect of downlink assignments associated with the value of the assignment property.

Optionally, the method further comprises: receiving a configuration of the reporting window that configures, based on a granularity, one or a combination of: a list of values of the assignment property that the reporting window applies to; start; end; duration; offset; periodicity; and an indication of which reporting occasion(s) within the reporting window are available for each value of the assignment property.

Optionally, for each of the at least two values of the assignment property, transmitting the respective combined UCI comprises transmitting the respective UCI during an earliest available reporting occasion within the reporting window.

Optionally, the method further comprises: for each of at least one value of the at least two values of the assignment property: receiving at least one uplink grant scheduling uplink data transmission on a physical uplink shared channel (PUSCH) associated with the value of the assignment property; transmitting the respective combined UCI on a physical uplink control channel associated with value of the assignment property or on the physical uplink shared channel associated with the value of the assignment property.

Optionally, for each of at least one value of the at least two values of the assignment property, transmitting the respective combined UCI on a physical uplink control channel associated with the value of the assignment property or on the physical uplink shared channel associated with the value of the assignment property comprises: when an uplink grant schedules uplink data transmission on the PUSCH associated with the value of the assignment property during a same occasion as one of the reporting occasions in the reporting window for that value of the assignment property, transmitting the combined UCI using the PUSCH associated with the value of the assignment property during the same occasion; and when there is no uplink grant scheduling uplink data transmission on the PUSCH associated with the value of the assignment property in the reporting window, transmitting the combined UCI using the value of the assignment property during the same occasion.

Optionally, combining UCI comprises: combining a respective hybrid automatic repeat request (HARQ) acknowledgement (ACK)/negative acknowledgement (NAK) field of each constituent UCI, when present, into a single HARQ ACK/NACK field; combining a respective scheduling request (SR) field of each constituent UCI, when present, into a single SR field; and combining a respective channel state information (CSI) of each constituent UCI, when present, into a single CSI field.

Optionally, combining UCI comprises: multiplexing constituent UCIs into the combined UCI, each constituent UCI comprising one or more of: a respective hybrid automatic repeat request (HARQ) acknowledgement (ACK)/negative acknowledgement (NAK) field; a respective scheduling request (SR) field; and a respective channel state information (CSI).

Optionally, transmitting the combined UCI comprises: encoding the combined UCI together with data to produce an encoded bitstream; transmitting the encoded bitstream on an uplink shared channel.

Optionally, transmitting the combined UCI comprises: multiplexing transmission of the combined UCI with transmission of data by: transmitting the combined UCI using first resources on an uplink shared channel, and transmitting data using second resources on the uplink shared channel.

According to one aspect of the present disclosure, there is provided a method in a base station (BS), the method comprising: transmitting a plurality of downlink assignments, each downlink assignment associated with a value of an assignment property; for each of at least two values of the assignment property, receiving a respective combined uplink control information (UCI) containing UCI in respect of each of at least two of the plurality of downlink assignments associated with the value of the assignment property.

Optionally, the assignment property is physical downlink control channel (PDCCH) identity or control resource set (CORESET) identity or beam information or radio network temporary identifier, or configurable UE identifier, or higher-layer sublayer, or HARQ entity, or demodulation reference symbol configuration.

Optionally, for each of at least two values of an assignment property, receiving a respective combined uplink control information (UCI) containing UCI in respect of each of at least two of the plurality of downlink assignments associated with the value of the assignment property comprises: using a respective physical uplink control channel (PUCCH) associated with the value of the assignment property.

Optionally, for each of at least two values of an assignment property, receiving a respective combined uplink control information (UCI) containing UCI in respect of each of at least two of the plurality of downlink assignments associated with the value of the assignment property comprises: for each of the at least two values of the assignment property: receiving the respective combined UCI in respect of downlink assignments associated with the value of the assignment property that are transmitted during a respective monitoring window.

Optionally, the method comprises: for each of the at least two values of the assignment property, transmitting a configuration of the respective monitoring window that configures, based on a granularity, one or a combination of: the assignment property that the monitoring window applies to; start; end; duration; offset; and periodicity.

Optionally, for each of at least two values of the assignment property, receiving a respective combined uplink control information (UCI) containing UCI in respect of each of at least two of the plurality of downlink assignments associated with the value of the assignment property comprises: for each of the at least two values of the assignment property, receiving the respective combined UCI in respect of downlink assignments associated with the value of the assignment property that are transmitted during a monitoring window.

Optionally, the method comprises: transmitting a configuration the monitoring window that configures, based on a granularity, one or a combination of: a list of values of the assignment property that the monitoring window applies to; start; end; duration; offset; and periodicity.

Optionally, the method further comprises: for each of the at least two values of the assignment property, receiving the respective combined UCI comprises receiving the respective combined UCI during a reporting window containing a plurality of reporting occasions; wherein the plurality of reporting occasions comprises, for each of the at least two values of the assignment property, a respective set of at least one reporting occasion that is available for a UE to transmit the combined UCI in respect of downlink assignments associated with the value of the assignment property.

Optionally, the method further comprises: transmitting a configuration of the reporting window that configures, based on a granularity, one or a combination of: a list of values of the assignment property that the reporting window applies to; start; end; duration; offset; periodicity; and an indication of which reporting occasion(s) within the reporting window are available for each value of the assignment property.

Optionally, for each of the at least two values of the assignment property, receiving the respective combined UCI comprises receiving the respective UCI during an earliest available reporting occasion within the reporting window.

Optionally, the method further comprises: for each of at least one value of the at least two values of the assignment property: transmitting at least one uplink grant scheduling uplink data transmission on a physical uplink shared channel (PUSCH) associated with the value of the assignment property; receiving the respective combined UCI on a physical uplink control channel associated with the value of the assignment property or on the physical uplink shared channel associated with the value of the assignment property.

Optionally, for each of at least one value of the at least two values of the assignment property, receiving the respective combined UCI on a physical uplink control channel associated with the value of the assignment property or on the physical uplink shared channel associated with the value of the assignment property comprises: when an uplink grant schedules uplink data transmission on the PUSCH associated with the value of the assignment property during a same occasion as one of the reporting occasions in the reporting window for that value of the assignment property, receiving the combined UCI using the PUSCH associated with the value of the assignment property during the same occasion; and when there is no uplink grant scheduling uplink data transmission on the PUSCH associated with the value of the assignment property in the reporting window, receiving the combined UCI using the value of the assignment property during the same occasion.

Optionally, receiving a combined UCI comprises receiving: a respective hybrid automatic repeat request (HARQ) acknowledgement (ACK)/negative acknowledgement (NAK) field of each constituent UCI, when present, combined into a single HARQ ACK/NACK field; a respective scheduling request (SR) field of each constituent UCI, when present, combined into a single SR field; and a respective channel state information (CSI) of each constituent UCI, when present, combined into a single CSI field.

Optionally, receiving a combined UCI comprises receiving: constituent UCIs multiplexed into the combined UCI, each constituent UCI comprising one or more of: a respective hybrid automatic repeat request (HARQ) acknowledgement (ACK)/negative acknowledgement (NAK) field; a respective scheduling request (SR) field; and a respective channel state information (CSI).

According to another aspect of the present disclosure, there is provided a user equipment comprising: a memory storage comprising instructions; and one or more processors in communication with the memory, wherein the one or more processors execute the instructions to: receive a plurality of downlink assignments; for each of at least two values of an assignment property, transmit a respective combined uplink control information (UCI) containing UCI in respect of each of at least two of the plurality of downlink assignments associated with the value of the assignment property.

Optionally, the assignment property is physical downlink control channel (PDCCH) identity or control resource set (CORESET) identity or beam information or radio network temporary identifier, or configurable UE identifier, or higher-layer sublayer, or HARQ entity, or demodulation reference symbol configuration.

Optionally, for each of at least two values of an assignment property, the UE is configured to transmit a respective combined uplink control information (UCI) containing UCI in respect of each of at least two of the plurality of downlink assignments associated with the value of the assignment property by: transmitting the respective combined uplink control information (UCI) on a respective physical uplink control channel (PUCCH) associated with the value of the assignment property.

Optionally, for each of at least two values of the assignment property, the UE is configured to transmit a respective combined uplink control information (UCI) containing UCI in respect of each of at least two of the plurality of downlink assignments associated with the value of the assignment property by: for each of the at least two values of the assignment property: monitoring for downlink assignments associated with the value of the assignment property that are received during a respective monitoring window; and transmitting the respective combined UCI in respect of downlink assignments associated with the value of the assignment property that are received during the respective monitoring window.

According to one aspect of the present disclosure, there is provided a base station comprising: a memory storage comprising instructions; and one or more processors in communication with the memory, wherein the one or more processors execute the instructions to: transmit a plurality of downlink assignments; for each of at least two values of an assignment property, receive a respective combined uplink control information (UCI) containing UCI in respect of each of at least two of the plurality of downlink assignments associated with the value of the assignment property.

Optionally, the assignment property is physical downlink control channel (PDCCH) identity or control resource set (CORESET) identity or beam information or radio network temporary identifier, or configurable UE identifier, or higher-layer sublayer, or HARQ entity, or demodulation reference symbol configuration.

Optionally, for each of at least two values of an assignment property, the base station is configured to receive a respective combined uplink control information (UCI) containing UCI in respect of each of at least two of the plurality of downlink assignments associated with the value of the assignment property by: using a respective physical uplink control channel (PUCCH) associated with the value of the assignment property.

Optionally, for each of at least two values of an assignment property, the base station is configured to receive a respective combined uplink control information (UCI) containing UCI in respect of each of at least two of the plurality of downlink assignments associated with the value of the assignment property by: for each of the at least two values of the assignment property: receiving the respective combined UCI in respect of downlink assignments associated with the value of the assignment property that are transmitted during a respective monitoring window.

Optionally, the base station is further configured to, for each of the at least two values of the assignment property, transmit a configuration of the respective monitoring window that configures, based on a granularity, one or a combination of: the assignment property that the monitoring window applies to; start; end; duration; offset; and periodicity.

BRIEF DESCRIPTION OF THE DRAWINGS

For a more complete understanding of the present embodiments, and the advantages thereof, reference is now made, by way of example, to the following descriptions taken in conjunction with the accompanying drawings, in which.

DETAILED DESCRIPTION

Figure 1:
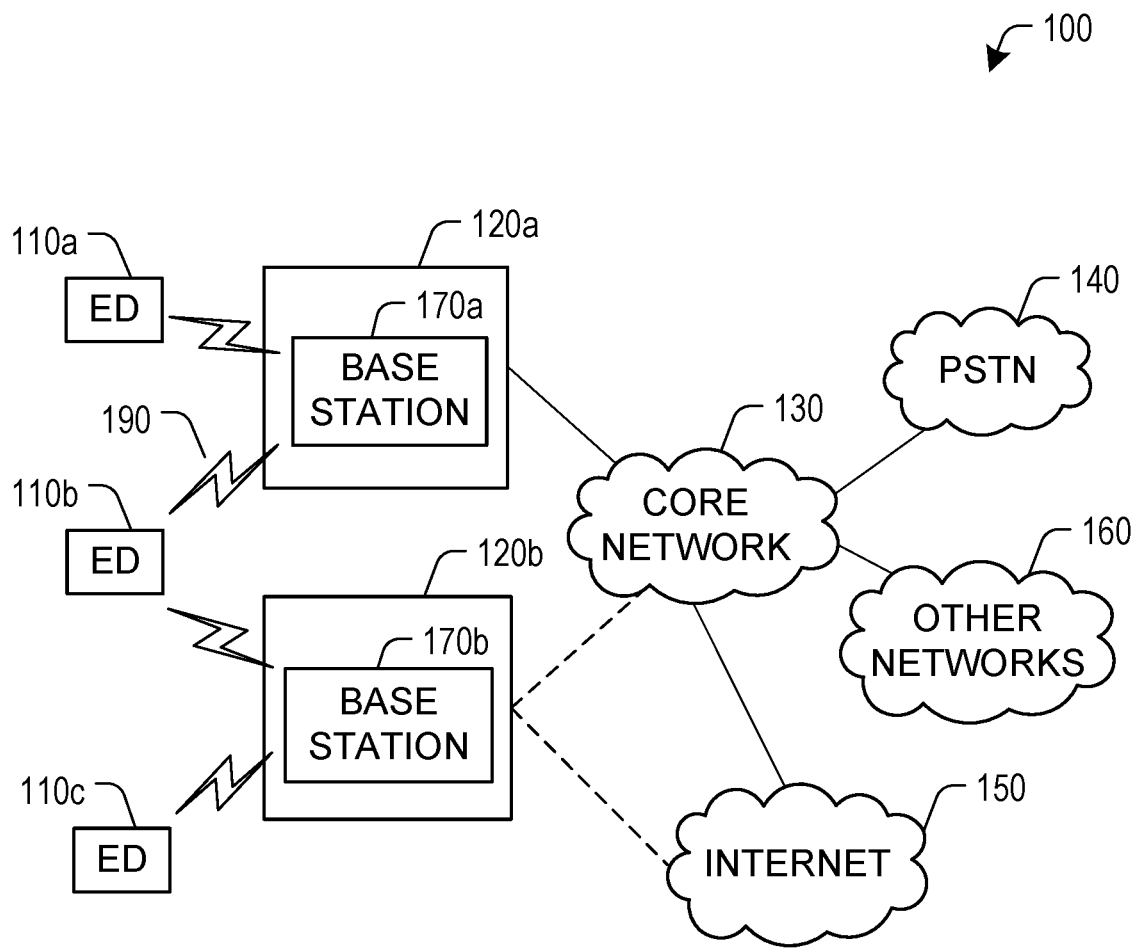
FIG. 1 illustrates an example communication system in which embodiments of the present disclosure could be implemented.

For NR (New Radio), a next evolution for wireless communications, it has been proposed that multiple TRPs may transmit downlink assignments to a UE. Specifically, methods have been proposed for configuring the UE with the reception of simultaneous multiple assignments for one unicast data channel type and aspects related to downlink control signaling for receiving multiple assignments. Methods have also been proposed for configuring the UE with the transmission of simultaneous multiple reports corresponding on a one-to-one basis with multiple assignments for one unicast data channel type.

This disclosure provides methods and systems for uplink signaling from a user equipment (UE) in relation to the simultaneous reception of multiple downlink assignments from multiple TRPs which can belong to the same or different NR cells by the UE. This disclosure is to provide uplink signaling mechanisms in correspondence to multiple downlink assignment reception by the UE, in which uplink control information (UCI) in respect of multiple downlink assignments is combined in a specific way, resulting in a more efficient signaling scheme than the existing one-to-one approach. In some embodiments, additionally, other advantages of a combined UCI design are reduced number of uplink transmissions (due to combining UCIs), reduced power consumption at the UE side (due to UE transmitting fewer times), lower UE hardware complexity (e.g. fewer RF chains).

In one embodiment, uplink signaling transmission can be semi-statically configured by the network such that the UE only transmits uplink signaling for assignments with a given value of an assignment property in specific reporting occasions (for example based on an assignment property that is one of PDCCH identity, CORESET ID, QCL indication, hybrid automatic repeat request (HARQ)/medium access control (MAC)/radio link control (RLC) entity, UE identifier, downlink control information (DCI) Format). Uplink signaling transmission can employ physical uplink control channel (PUCCH) and/or can be multiplexed or piggybacked on physical uplink shared channel (PUSCH) transmissions.

Embodiments of the present application pertain to control information for scheduling a transmission resource for downlink and uplink communications between one or more TRP and one or more UE, and to uplink reporting in respect of downlink communications. One Physical Downlink Control Channel (PDCCH) for DL control information transmission is assumed to carry at least one assignment or scheduling information block for at least one Physical Downlink Shared Channel (PDSCH) for DL data transmission or for at least one PUSCH for uplink data transmission. Moreover, in some implementations, one PDCCH can be associated with one HARQ process for one PDSCH or one PUSCH. The PDCCH for NR, may be referred to as NR-PDCCH. The cell for NR may be referred to as a NR-cell. The PDSCH for NR may be referred to as a NR-PDSCH. The PUCCH for NR may be referred to as a NR-PUCCH. The PUSCH for NR may be referred to as a NR-PUSCH. Generally, NR-PDCCH, NR-PDSCH, NR-PUSCH, NR-PUCCH are used for discussion within this application. Two antenna ports are said to be quasi co-located (QCL) if the large-scale properties of the channel over which a symbol on one antenna port is conveyed can be inferred from the channel over which a symbol on the other antenna port is conveyed. The large-scale properties include one or more of delay spread, Doppler spread, Doppler shift, average gain, average delay, and spatial Rx parameters. One control resource set (CORESET) group contains at least one CORESET. A CORESET is defined with a time (e.g. symbol/slot level)-frequency (e.g. PRB level) resource for PDCCH monitoring.

Table 1 below illustrates a relationship between two respective PDCCH and other characteristics associated with the respective PDCCH. $PDCCH_1$ may have an associated resource assignment (Assignment1), an associated downlink control information ($DCI_1$), an associated PDSCH ($PDSCH_1$) an associated PUSCH ($PUSCH_1$) and an associated hybrid automatic repeat request process (HARQ Process 1). Likewise, $PDCCH_2$ may have an associated resource assignment (Assignment2), an associated downlink control information ($DCI_2$), an associated PDSCH ($PDSCH_2$) an associated PUSCH ($PUSCH_2$) and an associated hybrid automatic repeat request process (HARQ Process 2). Each PDCCH does not necessarily include all of the associations all of the time, but they are examples of characteristics the PDCCH may have associations with.

TABLE 1

| A clarification for mapping between different terminologies | | | | | |
|---|---|---|---|---|---|
| $PDCCH_1$ | Assignment1 | $DCI_1$ | $PDSCH_1$ | $PUSCH_1$ | HARQ PROCESS 1 |
| $PDCCH_2$ | Assignment2 | $DCI_2$ | $PDSCH_2$ | $PUSCH_2$ | HARQ PROCESS 2 |

FIG. 1 illustrates an example communication system 100 in which embodiments of the present disclosure could be implemented. In general, the system 100 enables multiple wireless or wired elements to communicate data and other content. The purpose of the system 100 may be to provide content (voice, data, video, text) via broadcast, narrowcast, user device to user device, etc. The system 100 may operate efficiently by sharing resources such as bandwidth.

In this example, the communication system 100 includes electronic devices (ED) 110a-110c, radio access networks (RANs) 120a-120b, a core network 130, a public switched telephone network (PSTN) 140, the Internet 150, and other networks 160. While certain numbers of these components or elements are shown in FIG. 1, any reasonable number of these components or elements may be included in the system 100.

The EDs 110a-110c are configured to operate, communicate, or both, in the system 100. For example, the EDs 110a-110c are configured to transmit, receive, or both via wireless communication channels. Each ED 110a-110c represents any suitable end user device for wireless operation and may include such devices (or may be referred to) as a user equipment/device (UE), wireless transmit/receive unit (WTRU), mobile station, mobile subscriber unit, cellular telephone, station (STA), machine type communication device (MTC), personal digital assistant (PDA), smartphone, laptop, computer, touchpad, wireless sensor, or consumer electronics device.

In FIG. 1, the RANs 120a-120b include base stations 170a-170b, respectively. Each base station 170a-170b is configured to wirelessly interface with one or more of the EDs 110a-110c to enable access to any other base station 170a-170b, the core network 130, the PSTN 140, the Internet 150, and/or the other networks 160. For example, the base stations 170a-170b may include (or be) one or more of several well-known devices, such as a base transceiver station (BTS), a Node-B (NodeB), an evolved NodeB (eNodeB), a Home eNodeB, a gNodeB (sometimes called a "gigabit" NodeB), a transmission point (TP), a transmit/receive point (TRP), a site controller, an access point (AP), or a wireless router. When any of the example base stations listed above are described below, it is assumed that they are interchangeable with other types of base stations. Any ED 110a-110c may be alternatively or jointly configured to interface, access, or communicate with any other base station 170a-170b, the internet 150, the core network 130, the PSTN 140, the other networks 160, or any combination of the preceding. Optionally, the system may include RANs, such as RAN 120b, wherein the corresponding base station 170b accesses the core network 130 via the internet 150, as shown.

The EDs 110a-110c and base stations 170a-170b are examples of communication equipment that can be configured to implement some or all of the functionality and/or embodiments described herein. In the embodiment shown in FIG. 1, the base station 170a forms part of the RAN 120a, which may include other base stations, base station controller(s) (BSC), radio network controller(s) (RNC), relay nodes, elements, and/or devices. Any base station 170a, 170b may be a single element, as shown, or multiple elements, distributed in the corresponding RAN, or otherwise. Also, the base station 170b forms part of the RAN 120b, which may include other base stations, elements, and/or devices. Each base station 170a-170b may be configured to operate to transmit and/or receive wireless signals within a particular geographic region or area, sometimes referred to as a coverage area. A cell may be further divided into cell sectors, and a base station 170a-170b may, for example, employ multiple transceivers to provide service to multiple sectors. In some embodiments a base station 170a-170b may be implemented as pico or femto nodes where the radio access technology supports such. In some embodiments, multiple-input multiple-output (MIMO) technology may be employed having multiple transceivers for each coverage area. The number of RAN 120a-120b shown is exemplary only. Any number of RAN may be contemplated when devising the system 100.

The base stations 170a-170b communicate with one or more of the EDs 110a-110c over one or more air interfaces 190 using wireless communication links e.g. RF, μWave, IR, etc. The air interfaces 190 may utilize any suitable radio access technology. For example, the system 100 may implement one or more channel access methods, such as code division multiple access (CDMA), time division multiple access (TDMA), frequency division multiple access (FDMA), orthogonal FDMA (OFDMA), or single-carrier FDMA (SC-FDMA) in the air interfaces 190.

A base station 170a-170b may implement Universal Mobile Telecommunication System (UMTS) Terrestrial Radio Access (UTRA) to establish an air interface 190 using wideband CDMA (WCDMA). In doing so, the base station 170a-170b may implement protocols such as HSPA, HSPA+ optionally including HSDPA, HSUPA or both. Alternatively, a base station 170a-170b may establish an air interface 190 with Evolved UTMS Terrestrial Radio Access (E-UTRA) using LTE, LTE-A, and/or LTE-B. It is contemplated that the system 100 may use multiple channel access functionality, including such schemes as described above. Other radio technologies for implementing air interfaces include IEEE 802.11, 802.15, 802.16, CDMA2000, CDMA2000 1×, CDMA2000 EV-DO, IS-2000, IS-95, IS-856, GSM, EDGE, and GERAN. Of course, other multiple access schemes and wireless protocols may be utilized.

The RANs 120a-120b are in communication with the core network 130 to provide the EDs 110a-110c with various services such as voice, data, and other services. Understandably, the RANs 120a-120b and/or the core network 130 may be in direct or indirect communication with one or more other RANs (not shown), which may or may not be directly served by core network 130, and may or may not employ the same radio access technology as RAN 120a, RAN 120b or both. The core network 130 may also serve as a gateway access between (i) the RANs 120a-120b or EDs 110a-110c or both, and (ii) other networks (such as the PSTN 140, the Internet 150, and the other networks 160). In addition, some or all of the EDs 110a-110c may include functionality for communicating with different wireless networks over different wireless links using different wireless technologies and/or protocols. PSTN 140 may include circuit switched telephone networks for providing plain old telephone service (POTS). Internet 150 may include a network of computers and subnets (intranets) or both, and incorporate protocols, such as IP, TCP and UDP. EDs 110a-110c may be multimode devices capable of operation according to multiple radio access technologies, and incorporate multiple transceivers necessary to support such.

It is contemplated that the communication system 100 as illustrated in FIG. 1 may support a New Radio (NR) cell, which also may be referred to as hyper cell. Each NR cell includes one or more TRPs using the same NR cell ID. The NR cell ID is a logical assignment to all physical TRPs of the NR cell and may be carried in a broadcast synchronization signal. The NR cell may be dynamically configured. The boundary of the NR cell may be flexible and the system dynamically adds to or removes TRPs from the NR cell.

In one embodiment, a NR cell may have one or more TRPs within the NR cell transmitting a UE-specific data channel, which serves a UE. The one or more TRPs associated with the UE specific data channel are also UE specific and are transparent to the UE. Multiple parallel data channels within a single NR cell may be supported, each data channel serving a different UE.

In another embodiment, one or more TRPs within a NR cell may transmit a UE specific dedicated control channel, which serves a UE and carries UE-specific control information associated with the UE.

It is obviously understood that any number of NR cells may be implemented in the communication system 100.

Moreover, the system may apply TRP selection techniques to minimize intra-NR cell interference and inter-NR cell interference. In one embodiment, a TRP sends a downlink channel state information (CSI)-reference symbol (RS). Some pilot (also known as reference signal) ports may be defined such that the UEs can measure the channel state information and report it back to the network. A CSI-RS port is a pilot port defined as a set of known symbols from a sequence transmitted over known resource elements (for example OFDM resource elements) for UEs to measure the channel state. A UE assigned to measure a particular CSI-RS port can measure the transmitted CSI-RS sequence, measure the associated channel state and report it back to the network. The network, such as a controller, may select the best TRPs for all served UEs based on the downlink measurements.

Figure 2A:
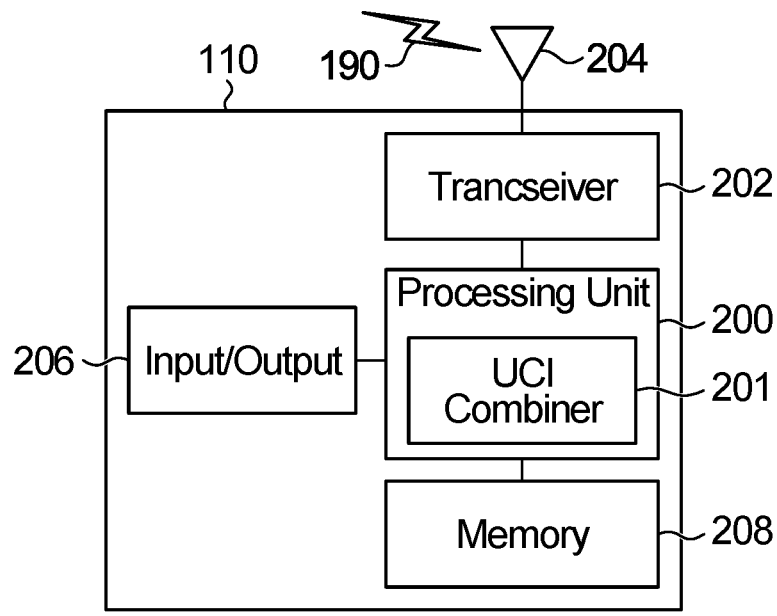
FIGS. 2A and 2B illustrate example devices that may implement the methods and teachings according to this disclosure.
Figure 2B:
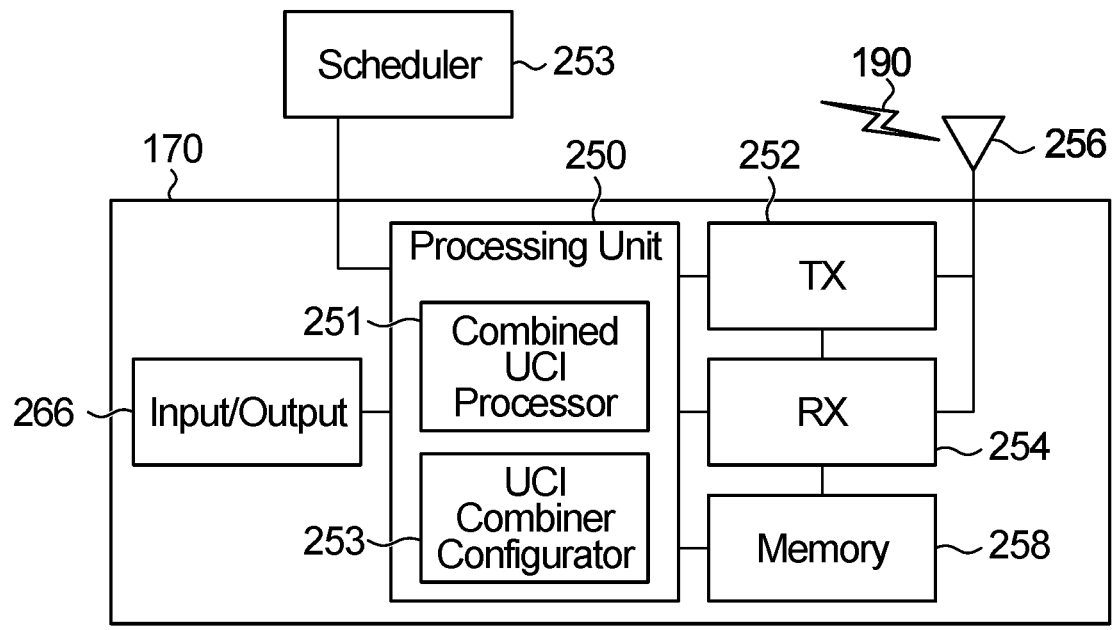

FIGS. 2A and 2B illustrate example devices that may implement the methods and teachings according to this disclosure. In particular, FIG. 2A illustrates an example ED 110, and FIG. 2B illustrates an example base station 170. These components could be used in the system 100 or in any other suitable system.

As shown in FIG. 2A, the ED 110 includes at least one processing unit 200. The processing unit 200 implements various processing operations of the ED 110. For example, the processing unit 200 could perform signal coding, data processing, power control, input/output processing, or any other functionality enabling the ED 110 to operate in the system 100. The processing unit 200 may also be configured to implement some or all of the functionality and/or embodiments described in more detail above. Each processing unit 200 includes any suitable processing or computing device configured to perform one or more operations. Each processing unit 200 could, for example, include a microprocessor, microcontroller, digital signal processor, field programmable gate array, or application specific integrated circuit.

The ED 110 also includes at least one transceiver 202. The transceiver 202 is configured to modulate data or other content for transmission by at least one antenna or NIC (Network Interface Controller) 204. The transceiver 202 is also configured to demodulate data or other content received by the at least one antenna 204. Each transceiver 202 includes any suitable structure for generating signals for wireless transmission and/or processing signals received wirelessly or by wire. Each antenna 204 includes any suitable structure for transmitting and/or receiving wireless signals. One or multiple transceivers 202 could be used in the ED 110, and one or multiple antennas 204 could be used in the ED 110. Although shown as a single functional unit, a transceiver 202 could also be implemented using at least one transmitter and at least one separate receiver.

The ED 110 further includes one or more input/output devices 206 or interfaces. The input/output devices 206 facilitate interaction with a user or other devices (network communications) in the network. Each input/output device 206 includes any suitable structure for providing information to or receiving/providing information from a user, such as a speaker, microphone, keypad, keyboard, display, or touch screen, including network interface communications.

In addition, the ED 110 includes at least one memory 208. The memory 208 stores instructions and data used, generated, or collected by the ED 110. For example, the memory 208 could store software instructions or modules configured to implement some or all of the functionality and/or embodiments described above and that are executed by the processing unit(s) 200. Each memory 208 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

The ED 110 includes a UCI combiner 210 implemented within processing unit 200 that generates combined UCIs in respect of downlink assignments using any one or combination of the detailed methods described below. In some embodiments, the ED encodes the combined UCI together with data to produce an encoded bitstream for transmission over the wireless channel. The UCI combiner 210 may perform this combination in accordance with configuration received from the network, for example through upper layer signaling, or based on default configurations, or a combination of both of these. While shown as a component of the processing unit 200, the UCI combiner may alternatively be a standalone unit. The processing unit and/or standalone unit may execute instructions stored in the memory, or may be hardwired with the required functionality.

As shown in FIG. 2B, the base station 170 includes at least one processing unit 250, at least one transmitter 252, at least one receiver 254, one or more antennas 256, at least one memory 258, and one or more input/output devices or interfaces 266. A transceiver, not shown, may be used instead of the transmitter 252 and receiver 254. A scheduler 253 may be coupled to the processing unit 250. The scheduler 253 may be included within or operated separately from the base station 170. The processing unit 250 implements various processing operations of the base station 170, such as signal coding, data processing, power control, input/output processing, or any other functionality. The processing unit 250 can also be configured to implement some or all of the functionality and/or embodiments described in more detail above. Each processing unit 250 includes any suitable processing or computing device configured to perform one or more operations. Each processing unit 250 could, for example, include a microprocessor, microcontroller, digital signal processor, field programmable gate array, or application specific integrated circuit.

Each transmitter 252 includes any suitable structure for generating signals for wireless transmission to one or more EDs or other devices. Each receiver 254 includes any suitable structure for processing signals received wirelessly or by wire from one or more EDs or other devices. Although shown as separate components, at least one transmitter 252 and at least one receiver 254 could be combined into a transceiver. Each antenna 256 includes any suitable structure for transmitting and/or receiving wireless signals. While a common antenna 256 is shown here as being coupled to both the transmitter 252 and the receiver 254, one or more antennas 256 could be coupled to the transmitter(s) 252, and one or more separate antennas 256 could be coupled to the receiver(s) 254. Each memory 258 includes any suitable volatile and/or non-volatile storage and retrieval device(s) such as those described above in connection to the ED 110. The memory 258 stores instructions and data used, generated, or collected by the base station 170. For example, the memory 258 could store software instructions or modules configured to implement some or all of the functionality and/or embodiments described above and that are executed by the processing unit(s) 250.

Each input/output device 266 facilitates interaction with a user or other devices (network communications) in the network. Each input/output device 266 includes any suitable structure for providing information to or receiving/providing information from a user, including network interface communications.

The processing unit 250 includes a combined UCI processor 251 which received and processes combined UCIs transmitted in accordance with any of the methods described herein. Also shown is a UCI combiner configurator 253 which transmits signaling to the ED in order to configure UCI combination behavior. While shown as components of the processing unit 250, the combined processor 251 and the UCI combiner configurator 253 may alternatively be stand-alone units. The processing unit 250 and/or standalone units may execute instructions stored in the memory, or may be hardwired with the required functionality.

It should be appreciated that one or more steps of the embodiment methods provided herein may be performed by corresponding units or modules, according to FIGS. 2A and 2B. For example, a signal may be transmitted by a transmitting unit or a transmitting module. A signal may be received by a receiving unit or a receiving module. A signal may be processed by a processing unit or a processing module. The respective units/modules may be hardware, software, or a combination thereof. For instance, one or more of the units/modules may be an integrated circuit, such as field programmable gate arrays (FPGAs) or application-specific integrated circuits (ASICs). It will be appreciated that where the modules are software, they may be retrieved by a processor, in whole or part as needed, individually or together for processing, in single or multiple instances as required, and that the modules themselves may include instructions for further deployment and instantiation.

A UE can monitor one or more control resource sets (CORESET) for downlink control information. Long term Evolution (LTE) is known to support UE specific and/or case specific search space definitions. A time/frequency resource set (i.e. control resource set) can be defined as a set of Resource Element Groups (REGs) under a given numerology. In some implementations a REG is four consecutive Resource Elements (REs). An RE is a smallest transmission resource element, which may, for example, be 1 symbol by 1 sub-carrier. A CORESET may be made up of multiples resource blocks (i.e, multiples of 12 REs) in the frequency domain.

A search space for one search space type may be defined by at least some of the following properties: one or more aggregation levels (AL), a number of decoding candidates (i.e. a candidate number (CN)) for each aggregation level and a set of Control Channel Elements (CCEs) for each decoding candidate. A candidate is a location in the search space that may include downlink control information for the UE. Thus, a candidate number is a defined number of potential locations in the search space. In some implementations, a CCE may be nine consecutive REGs. An aggregation level may be defined as 1, 2, 4, or 8 consecutive CCEs. As an example, an aggregation level of 2 would be 2 consecutive CCEs.

In some implementations, in the time domain, a CORESET may comprise one OFDM symbol or a set of contiguous or non-contiguous OFDM symbols. The configuration for the CORESET may be defined in various different ways. For example, the CORESET can be defined based on a starting OFDM symbol and a time duration. Another example may include defining a number of OFDM symbols. In some embodiments, a CORESET may be configured with a single Control Channel Element-to-Resource Element Group (CCE-to-REG) mapping.

Figure 3A:
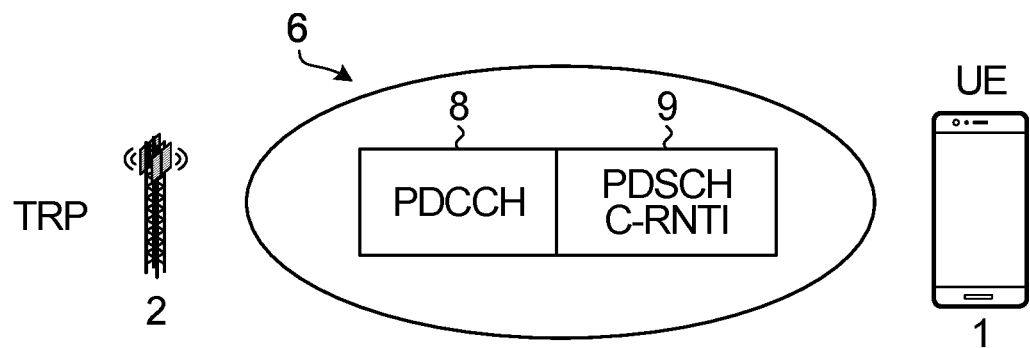
FIG. 3A is a representative illustration of a Physical Downlink Control Channel (PDCCH) and a Physical Downlink Shared Channel (PDSCH) communication between a transmit receive point (TRP) and a user equipment in a cell.
Figure 3B:
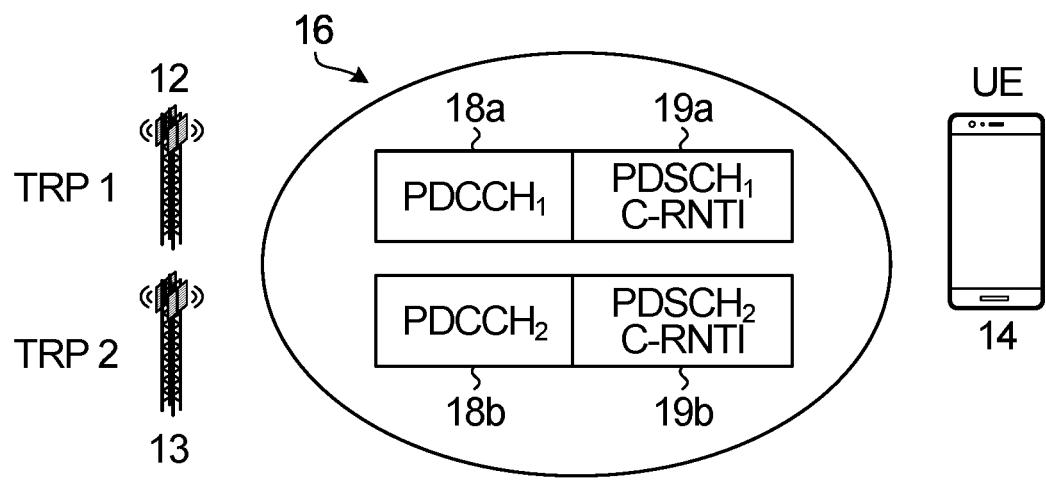
FIG. 3B is a representative illustration of PDCCH and PDSCH communications between two TRPs and a single user equipment in a cell.

Embodiments of the present disclosure pertain to communications between multiple TRPs in a single cell (or in different cells) and a UE. FIG. 3B illustrates, for a region 16, an example of communication according to embodiments of the present application between two TRPs, TRP 12 and TRP 13, and a single UE 14. FIG. 3B includes an example of PDCCH$_1$ 18a being transmitted along with PDSCH$_1$ 19a from TRP 12 and PDCCH$_2$ 18b being transmitted along with PDSCH$_2$ 19b from TRP 13. PDCCH$_1$ 18a is used to carry one assignment for PDSCH$_1$ 19a and PDCCH$_2$ 18b is used to carry another assignment for PDSCH$_2$ 19b. PDSCH$_1$ 19a and PDSCH$_2$ 19b also are associated with a C-RNTI for identifying the UE that the assignment is for. In FIG. 3B, the C-RNTI identifies UE 14.

Continuing with the example of FIG. 3B, there may be multiple assignments for PDCCH$_1$ and multiple assignments for PDCCH$_2$. In accordance with embodiments of the disclosure, rather than transmitting UCI on a one-to-one basis corresponding with the downlink assignments, UCI for multiple downlink assignments for the same PDCCH (or some other assignment property) are combined.

Embodiments of the disclosure provide methods through which the UE selects downlink assignments scheduling data transmissions whose UCIs the UE combines and transmits this combined UCI over a PUCCH transmission or a PUSCH transmission.

The UE uses a specific assignment property (e.g. PDCCH identity, CORESET ID, QCL indication, etc.) to determine which assignments' corresponding UCIs it should combine. In some embodiments detailed below, a configuration of a monitoring window constrains the number of assignments whose corresponding UCIs the UE can combine together in a PUCCH transmission. In some embodiments detailed below, the configuration of a reporting window constrains the number of reporting occasions where a UE can transmit a PUCCH carrying a combined UCI towards a given TRP.

In some embodiments, at least some of the time, combined UCIs can be multiplexed or piggy-backed on PUSCH data transmissions instead of being transmitted in PUCCH transmissions. The UE may employ a mechanism to select between transmitting uplink signaling over a control channel or a data channel, which can be captured in the form of priority rules or configured as part of the reporting window for a given assignment property.

Methods of Combining UCI Formats

A transmission a UCI format includes one or a combination of the following fields:

1. HARQ acknowledgement (ACK)/negative ACK (NACK) bit(s) in respect of previously received downlink transmissions;
2. Scheduling request (SR) bit(s) to request resources to be scheduled for the UE;
3. CSI bit(s) to convey the state of the downlink channel.

Methods are provided to combine UCI formats, each including one or more of the fields identified above. The UCI formats being combined are referred to below as constituent UCI formats. Either one of these specific methods of combining UCI formats may be employed with any of the embodiments described herein. Alternatively, a different method of combining UCI formats may be employed.

First Method of Combining UCI Formats

In a first method of combining UCI formats, the combined UCI format has a single corresponding field for each of the UCI fields identified above that contains the bits of the corresponding fields of the constituent UCI formats. Thus, the combined UCI format has a HARQ ACK/NACK field containing HARQ ACK/NACK bits of all of the constituent UCI formats, a SR field containing SR bits of all of the constituent UCI formats, and a CSI field containing CSI bits of all of the constituent UCI formats.

Figure 4:
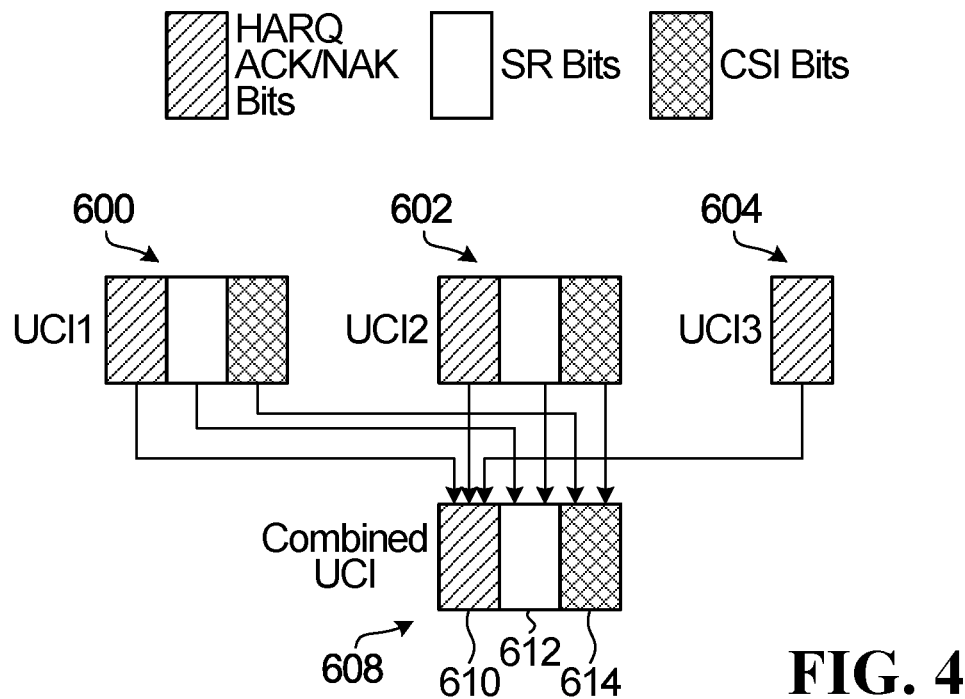
FIGS. 4 and 5 are schematic diagrams showing two methods of combining constituent UCIs into a combined UCI.

An example is shown in FIG. 4, where a first UCI format UCI1 600, a second UCI format UCI2 602, and a third UCI format UCI3 604 are to be combined into a combined UCI format 608. Each of the UCI formats UCI1, UCI2 600,602, have fields for HARQ ACK/NACK, SR bits, and CSI bits, while UCI format UCI3 604 includes only HARQ ACK/NACK bits. In the combined UCI format 608, there is a single field 610 containing a concatenation of the HARQ ACK/NACK bits of all of the constituent UCI formats 600,602,604, a single field 612 containing a concatenation of the SR bits of all of the constituent UCI formats 600, 602,604, and a single field 614 containing a concatenation of the CSI bits of all of the constituent UCI formats 600,602, 604.

In the illustrated example for this embodiment and all other embodiments described herein, the order of the fields is HARQ ACK/NACK, SR, CSI, but other orders may be used so long as transmitter and receiver are aware of the order.

With this method, the UE combines the different UCI formats by combining individual bits of the HARQ ACK/NACK, SR and CS report from each individual UCI format into the combined UCI format described above.

Second Method of Combining UCI Formats

In a second method of combining UCI formats, the combined UCI format has a respective corresponding field for each UCI field of each constituent UCI identified above that contains the bits of the corresponding field of the constituent UCI format. This amounts to aggregating the bits of the constituent UCI formats together. Thus, the combined UCI format has a HARQ ACK/NACK, SR and CSI fields of a first constituent UCI format, followed by HARQ ACK/NACK, SR and CSI fields of a second constituent UCI format, followed by HARQ ACK/NACK, SR and CSI fields of a third constituent UCI format and so on for all constituent UCI formats. Not every constituent UCI format need include all three fields.

Figure 5:
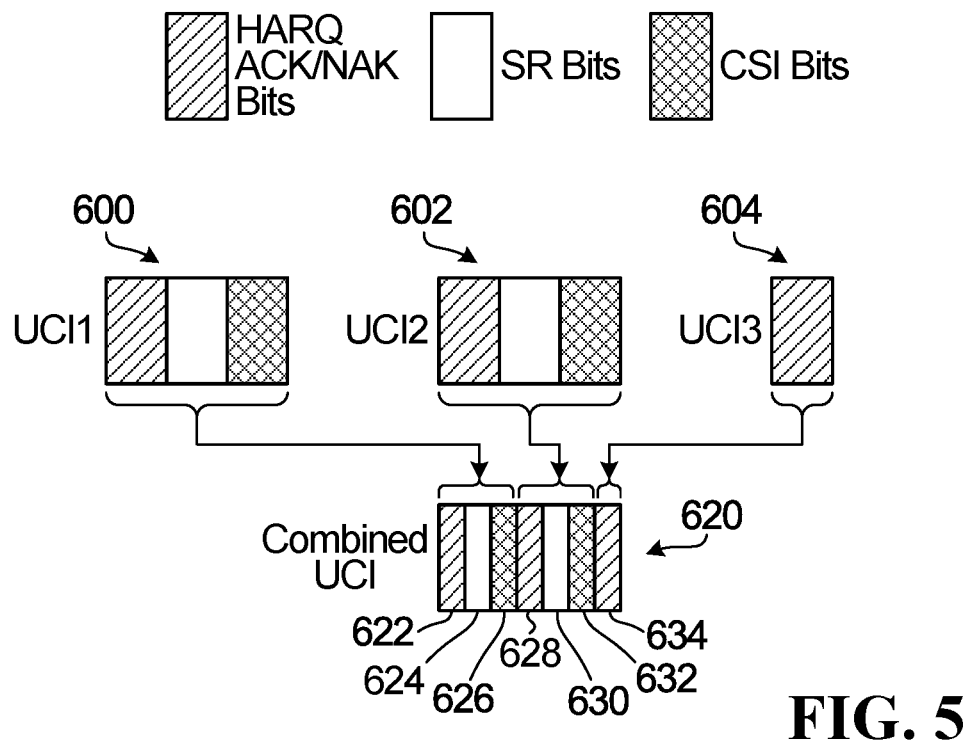

An example is shown in FIG. 5 which shows the same constituent UCI formats 600,602,604 as detailed above in the description of FIG. 4. In the combined UCI format 620, there are fields 622,624,626 corresponding to the fields of UCI format 600, fields 628,630,632 corresponding to the fields of UCI format 602, field 634 corresponding to the field of UCI format 604.

With this method, the UE aggregates different UCI formats by aggregating individual bits of HARQ ACK, SR and CSI report from each individual UCI format together.

Combined UCI Transmission Using Piggy-Backing

In some embodiments, the UE maps the combined UCI to be piggy-backed on resource elements that are part of an uplink data transmission. The resource elements on which the UE maps the combined UCI may or may not be pre-specified. In the case of piggy-backing, the PUSCH including the piggy-backed UCI are encoded together, such that the network needs to decode the PUSCH transmission correctly in order to recover the information within the combined UCI.

Figure 6:
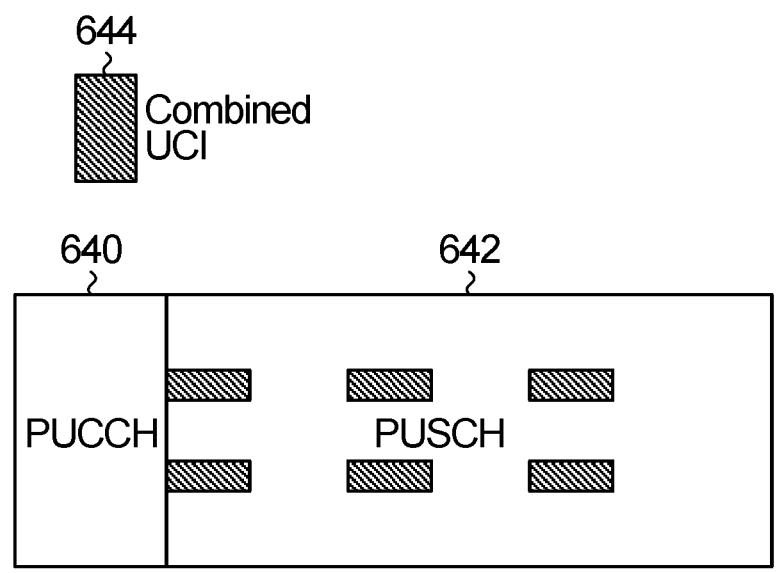
FIG. 6 shows an example of UCI combining in which the UE maps the combined UCI to be piggy-backed on resource elements that are part of an uplink data transmission.

An example is shown in FIG. 6, which shows resources 640 for PUCCH transmission, and resources 642 for PUSCH transmission. The combined UCI 644 is transmitted within the resources 642 for PUSCH transmission.

Combined UCI Transmission Using Multiplexing

In some embodiments, the UE maps the combined UCI to be multiplexed on resource elements that are part of an uplink data transmission. The resource elements on which the UE maps the combined UCI may or may not be pre-specified. In the case of multiplexing, the UCI is separately encoded from the uplink data. As such, the network can independently decode the bits corresponding to the combined UCI.

Figure 7:
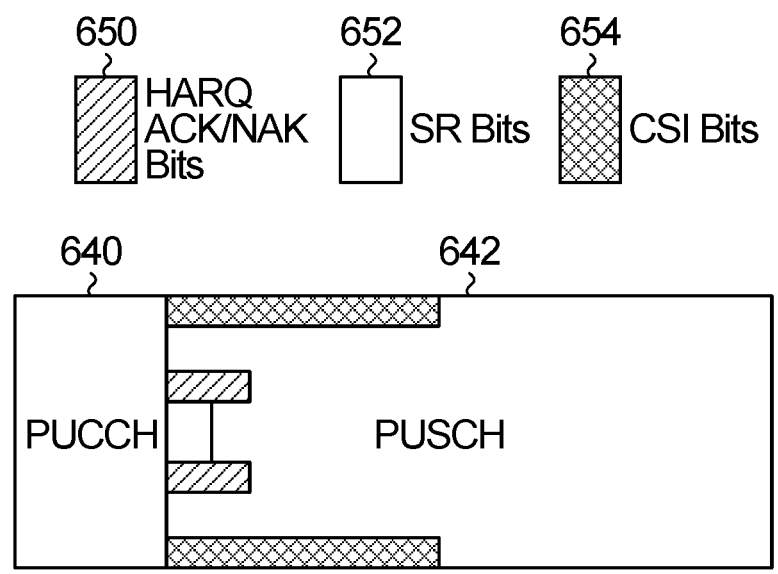
FIG. 7 shows an example of UCI combining in which the UE maps the combined UCI to be multiplexed on resource elements that are part of an uplink data transmission.

An example is shown in FIG. 7 which again shows resources 640 for PUCCH transmission, and resources 642 for PUSCH transmission. The fields 650,652,654 of a combined UCI 644 are transmitted within the resources 642 for PUSCH transmission.

Embodiments have been described in which the UE can combine multiple UCI formats. The UE can either piggy-back or multiplex the combined UCI on an uplink data transmission. This allows the UE to reduce the number of uplink transmissions for signaling purposes at the expense of a higher bitrate.

For any of the embodiments described herein, unless otherwise specified, the combined UCI can be transmitted using a PUCCH transmission, or using piggy-backing and/or multiplexing on a PUSCH transmission.

Methods of Determining UCIs to Combine into a Combined UCI Based on Property of PDCCH Various embodiments are provided that involve specific methods of deciding which UCIs that a UE should combine into a combined UCI based on a property of the assignments.

First Method: Combine UCI Formats for Downlink Assignments Based on Value of PDCCH Identity In a first method, the UE combines UCI formats for received downlink assignments that have the same value of PDCCH identity.

Figure 8:
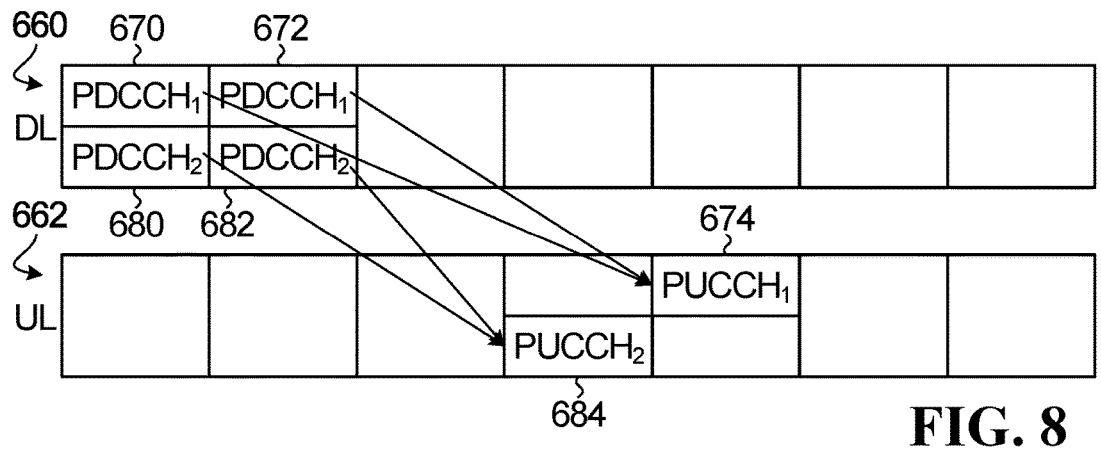
FIG. 8 shows an example of UCI combining in which the UE combines UCI formats for received downlink assignments that have the same value of PDCCH identity.

An example is shown in FIG. 8 which shows downlink (DL) transmissions 660 and uplink (UL) transmissions 662. In FIG. 8, and other Figures described below, time is on the horizontal axis, and frequency is in the vertical axis. The time axis is divided into a set of slots (seven in the illustrated example) during which downlink assignments can be transmitted by the network and/or UCIs can be transmitted by a UE. On the downlink 660, there are UE assignments 670, 672 having the same PDCCH identity $PDCCH_1$. On the uplink 662, there is a corresponding combined UCI transmission $PUCCH_1$ 674. Also, on the downlink 660, there are UE assignments 680,682 having the same PDCCH identity $PDCCH_2$. On the uplink 662, there is a corresponding combined UCI transmission $PUCCH_2$ 684.

The UE behavior is as follows:

for assignments received whose PDCCH identity=$PDCCH_1$, the UE combines the UCIs corresponding to the assignments and reports the combined UCI by transmitting a corresponding PUCCH transmission in a given reporting occasion;

for assignments received whose PDCCH identity=$PDCCH_2$, the UE combines the UCIs corresponding to the assignments and reports the combined UCI by transmitting a corresponding PUCCH transmission in a given reporting occasion.

This embodiment provides a mechanism whereby the UE is able to transmit uplink feedback signaling, in the case of multiple downlink assignment reception, over PUCCHs transmitted on different reporting occasions by separating assignments based on their property (PDCCH identity in this embodiment). With this example, the UE transmits at most a single combined UCI format per reporting occasion. In some embodiments, these approaches are applied for simultaneously received downlink assignments, but in other embodiments, the approaches can be applied to downlink assignments that are not received simultaneously.

Second Method: Combine UCI Formats for Downlink Assignments Based on CORESET Identity In a second method, the UE combines UE formats for received downlink assignments that have the same control resource set (CORESET) identity.

Figure 9:
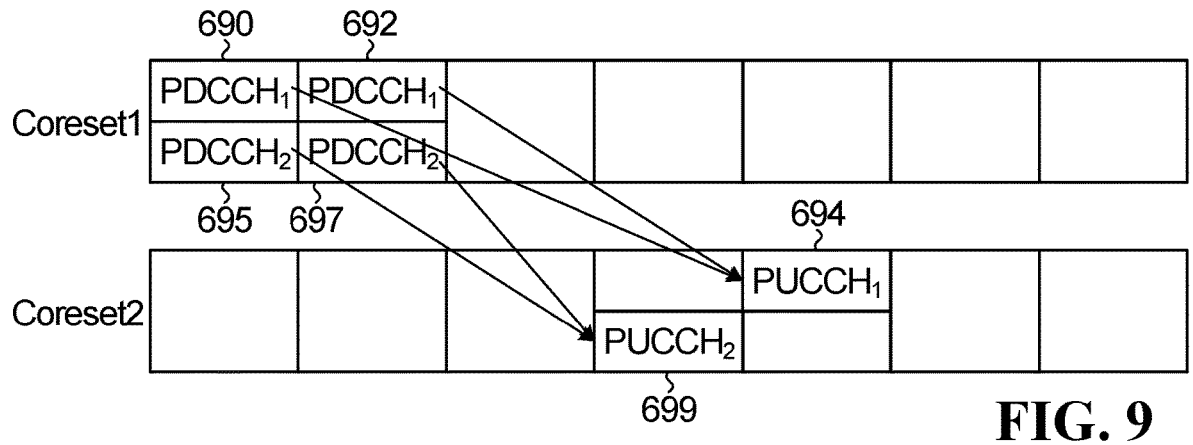
FIG. 9 shows an example of UCI combining in which the UE combines UCI formats for received downlink assignments that have the same value of CORESET identity.

An example is shown in FIG. 9. On the downlink, there are UE assignments 690,692 having the same CORESET identity $CORESET_1$. On the uplink, there is a corresponding combined UCI transmission $PUCCH_1$ 694. Also, on the downlink, there are UE assignments 695,697 having the same CORESET identity $CORESET_1$. On the uplink, there is a corresponding combined UCI transmission $PUCCH_2$ 699.

The UE behavior is as follows:
for assignments received whose CORESET ID is $CORESET\_ID_1$, the UE combines the UCIs corresponding to the assignments having $CORESET\_ID_1$ and reports the combined UCI by transmitting a corresponding PUCCH transmission in a given reporting occasion;
for assignments received whose CORESET ID is $CORESET\_ID_2$, the UE combines the UCIs corresponding to the assignments having $CORESET\_ID_2$ and reports the combined UCI by transmitting a corresponding PUCCH transmission in a given reporting occasion.

This embodiment provides a method whereby the UE is able to transmit uplink feedback signaling in the case of simultaneous multiple downlink assignment reception over PUCCHs transmitted on different reporting occasions by separating assignments based on their property (CORESET ID).

Third Method: Combine UCI Formats for Downlink Assignments Based on Beam Information In a third method, the UE combines UE formats for received downlink assignments that the same beam information, for example, the same quasi-co-located information (QCL). The purpose of QCL is to let a UE know that some reference signals may share the same channel properties as some other reference signal. These properties are often longer term statistical properties such as average delay, channel average gain, Doppler shift and Doppler spread.

In the context of this embodiment, two downlink assignments may be configured such that their corresponding PDCCH DMRS ports are QCL-ed with the same given RS port. So the UE can infer that the DMRSs used by both assignments share the same channel properties, which can be interpreted as the two DL assignments coming from the same TRP.

Figure 10:
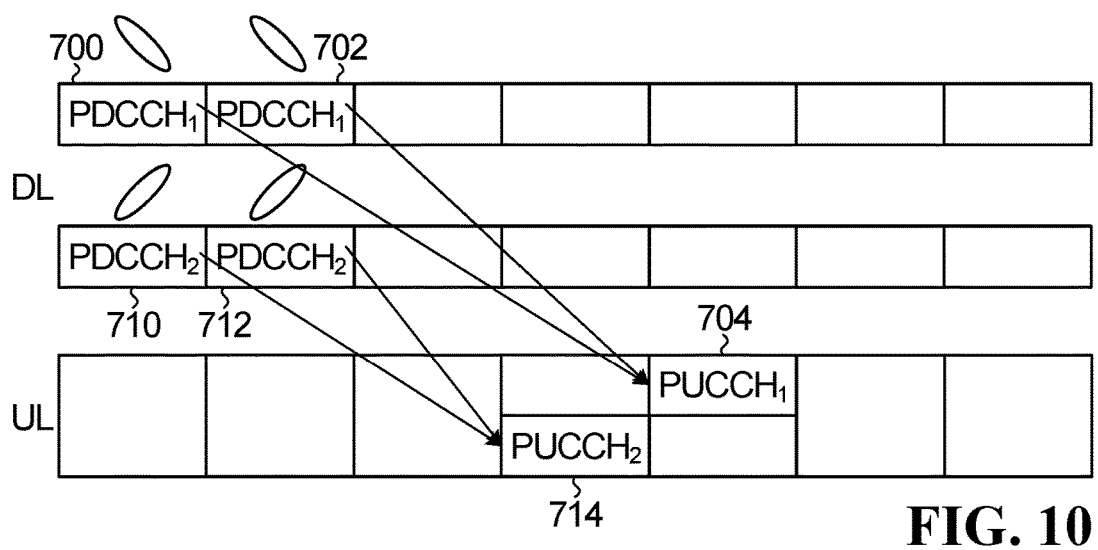
FIG. 10 shows an example of UCI combining in which the UE combines UCI formats for received downlink assignments that have the same value of beam information.

An example is shown in FIG. 10. On the downlink, there are UE assignments 700,702 having the same beam information $QCL_1$. On the uplink, there is a corresponding combined UCI transmission $PUCCH_1$ 704. Also, on the downlink, there are UE assignments 710,712 having the same beam information $QCL_2$. On the uplink, there is a corresponding combined UCI transmission $PUCCH_2$ 614.

The UE behavior is as follows:
For assignments received whose beam information is $QCL_1$, the UE combines the UCIs corresponding to the assignments whose beam information is $QCL_1$ and reports the combined UCI by transmitting a corresponding uplink transmission in a given reporting occasion;
For assignments received whose beam information is $QCL_2$, the UE combines the UCIs corresponding to the assignments whose beam information is $QCL_2$ and reports the combined UCI by transmitting a corresponding uplink transmission in a given reporting occasion.

This embodiment provides a method whereby the UE is able to transmit uplink feedback signaling, in the case of simultaneous multiple downlink assignment reception, over PUCCHs transmitted on different reporting occasions by separating assignments based on their beam information (QCL).

The three methods above involve combining UCIs based on a particular property. The three examples include PDCCH identity, CORESET identity, and beam information. It should be understood that UCIs can be combined based on other properties in other embodiments. Other specific examples include radio network temporary identifier (RNTI), configurable UE ID, higher-layer sublayer, a HARQ entity, and a Demodulation Reference Signal (DMRS) configuration. In the context of this embodiment, higher-layer sub-layers can mean MAC, RLC or PDCP layers. Technically these are all part of the data link layer which is why they are called "sub-layers".

Methods of Determining UCIs to Combine into a Combined UCI Based on the Timing of PDCCH Transmission The embodiments described above introduce the combination of UCIs based on assignment property, but do not specify exactly which UCIs for downlink assignments having a given value of the assignment property should be combined into a single combined UCI. Further embodiments specify which UCIs for downlink assignments of a given property are to be combined into a combined UCI.

Downlink Assignment Property Specific Monitoring Windows

In some embodiments, a UE is configured with one or more downlink assignment property specific monitoring windows. A monitoring window consists of a number of monitoring occasions. Each monitoring window is associated with one or more values of an assignment property (e.g. specific PDCCH identity or specific CORESET identify or specific beam information or some other property). The monitoring windows may be configured via higher-layer signaling (e.g. radio resource control (RRC), medium access control (MAC)-control entity (CE)). For a given assignment property, the UCIs in respect of any assignments received during the corresponding monitoring window should be combined into a combined UCI.

In some embodiments, the monitoring window is configured, for example using higher-layer signaling, based on one or more of:
  starting slot;
  ending slot;
  monitoring window duration in number of slots;
  monitoring window offset in number of slots; and
  monitoring window periodicity in number of slots.

In the above example, the monitoring window is configured using parameters based on slots, but alternatively for any of the embodiments described herein, the monitoring window can be defined using parameters that are the based on some other granularity. Other specific example granularities include monitoring occasions, OFDM symbols, and groups of OFDM symbols. The monitoring window offset, when used, indicates an offset relative to a reference starting point.

In some embodiments, higher layer signaling of the monitoring window configuration also serves as an instruction to perform UCI combining. In this case, a UE that is configured with a monitoring window is instructed to combine UCIs in respect of assignments received in the monitoring window, and a UE that is not configured with the monitoring window is instructed to transmit UCI independently without combining.

Figure 11:
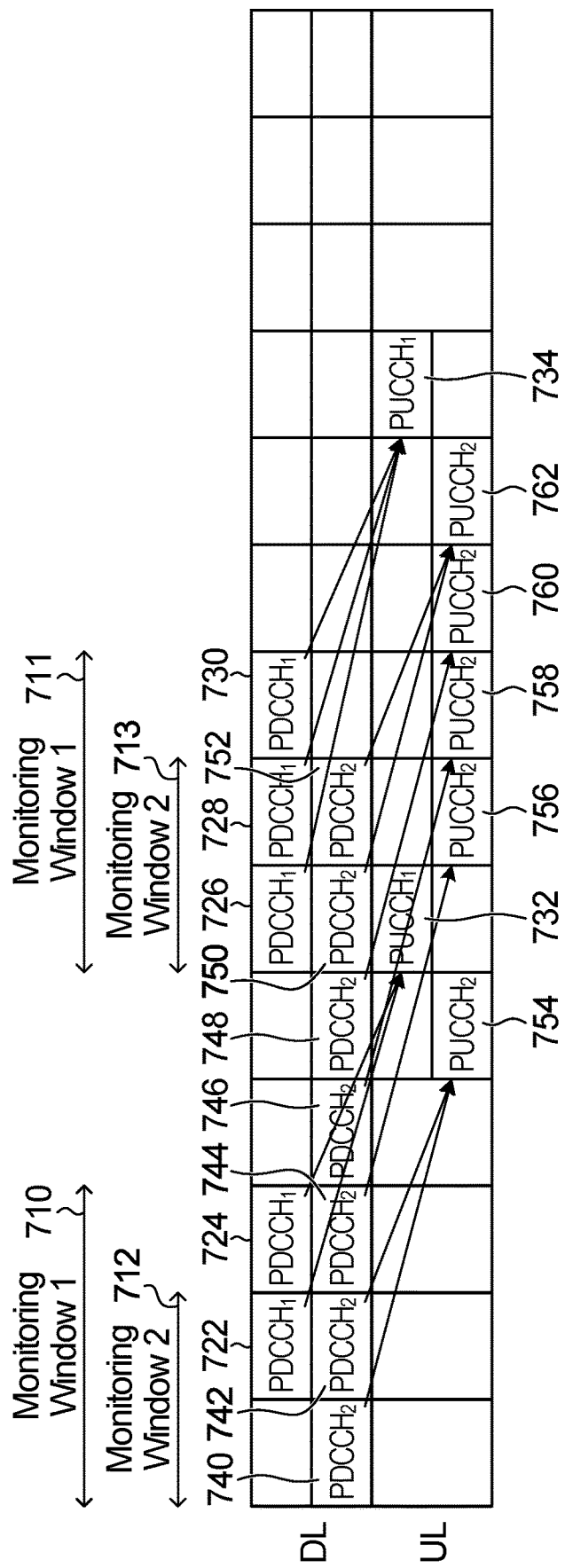
FIG. 11 shows an example of UCI combining in which the UE combines UCI formats for received downlink assignments that have the same value of PDCCH identity using a respective monitoring window for each value of the PDCCH identity.

A specific example of UCI combining based on PDCCH identity, is shown in FIG. 11, in which the UE is configured with 2 monitoring windows 710,712, one for each of two PDCCH identities.

Monitoring Window 1: mt_starting_slot=0;
  mt_ending_slot=2;
  mt_periodicity=5;
  mt_offset=0;
  mt_property=PDCCH$_1$
Monitoring Window 2: mt_starting_slot=0;
  mt_ending_slot=1;
  mt_periodicity=5;
  mt_offset=0;
  mt_property=PDCCH$_2$
  a) Expected UE behaviour: for any assignment(s) whose PDCCH identity is PDCCH$_1$ received in Monitoring Window 1, the UE is to combine the UCI(s) and report in same PUCCH$_1$
  b) for any assignment(s) whose PDCCH identity is PDCCH$_1$ not received in Monitoring Window 1, the UE is to report the UCI(s) in separate/independent PUCCH$_1$
  c) for any assignment(s) whose PDCCH identity is PDCCH$_2$ received in Monitoring Window 2, the UE is to combine the UCI(s) and report in same PUCCH$_2$
  d) for any assignment(s) whose PDCCH identity is PDCCH$_2$ not received in Monitoring Window 2, the UE is to report the UCI(s) in separate/independent PUCCH$_2$ The specific example of this behavior depicted in FIG. 11 will now be described, starting with the behavior for assignments with PDCCH$_1$. During a first monitoring window 1 710, there are two assignments 722,724 with PDCCH$_1$. A combined UCI 732 is transmitted in the 6$^{th}$ slot. During a second monitoring window 1 711, there are three assignments 726,728,730 with PDCCH$_1$. A combined UCI 734 is transmitted in the 11$^{th}$ slot.

Turning now to the behavior for assignments with PDCCH$_2$. During a first monitoring window 2 712, there are two assignments 740,742 with PDCCH$_2$. A combined UCI 754 is transmitted in the 5$^{th}$ slot. During a second monitoring window 2 713, there are two assignments 750,752 with PDCCH$_2$. A combined UCI 762 is transmitted in the 10$^{th}$ slot. Also shown are assignments 744, 746,748 that are not during a monitoring window 2 for PDCCH$_2$. As such, individual UCIs are transmitted at 756,758,760 in respect of these assignments The UE behavior is as follows:
For every assignment received within the corresponding monitoring window whose PDCCH identity is PDCCH$_1$, the UE combines the UCIs corresponding to the assignments whose PDCCH identity is PDCCH$_1$ and reports the combined UCI by transmitting a corresponding uplink transmission towards the TRP transmitting assignments whose PDCCH identity is PDCCH$_1$. For assignments received outside the monitoring window, the UE does not combine the corresponding UCI with any other UCI;
For every assignment received within the corresponding monitoring window whose PDCCH identity is PDCCH$_2$, the UE combines the UCIs corresponding to the assignments whose PDCCH identity is PDCCH$_1$ and reports the combined UCI by transmitting a corresponding uplink transmission towards the TRP transmitting assignments whose PDCCH identity is PDCCH$_2$. For assignments received outside the monitoring window, the UE does not combine the corresponding UCI with any other UCI.

This embodiment provides a method whereby the UE is able to transmit uplink feedback signaling, in the case of simultaneous multiple downlink assignment reception, over PUCCHs. Different TRPs schedule downlink transmissions independently from each-other but the use of monitoring windows allows the network to control the UE behavior for UCI combining in a semi-static manner. This approach may be particularly suitable in deployments with non-ideal backhaul. The reason for this is that in some implementations, TRPs may not be expected to collaborate on a dynamic basis under the assumption of non-ideal backhaul. In particular they may not collaborate on instructing a UE to transmit uplink signaling such that the transmission of uplink signaling for a given TRP does not collide with the transmission of uplink signaling for another TRP. As a result, such TRPs may accidently ask for uplink signaling in the same slot from a UE that does not have such a capability. The solutions described in this embodiment help to tackle that issue by pre-defining when a UE can report uplink signaling to a given TRP.

Figure 12:
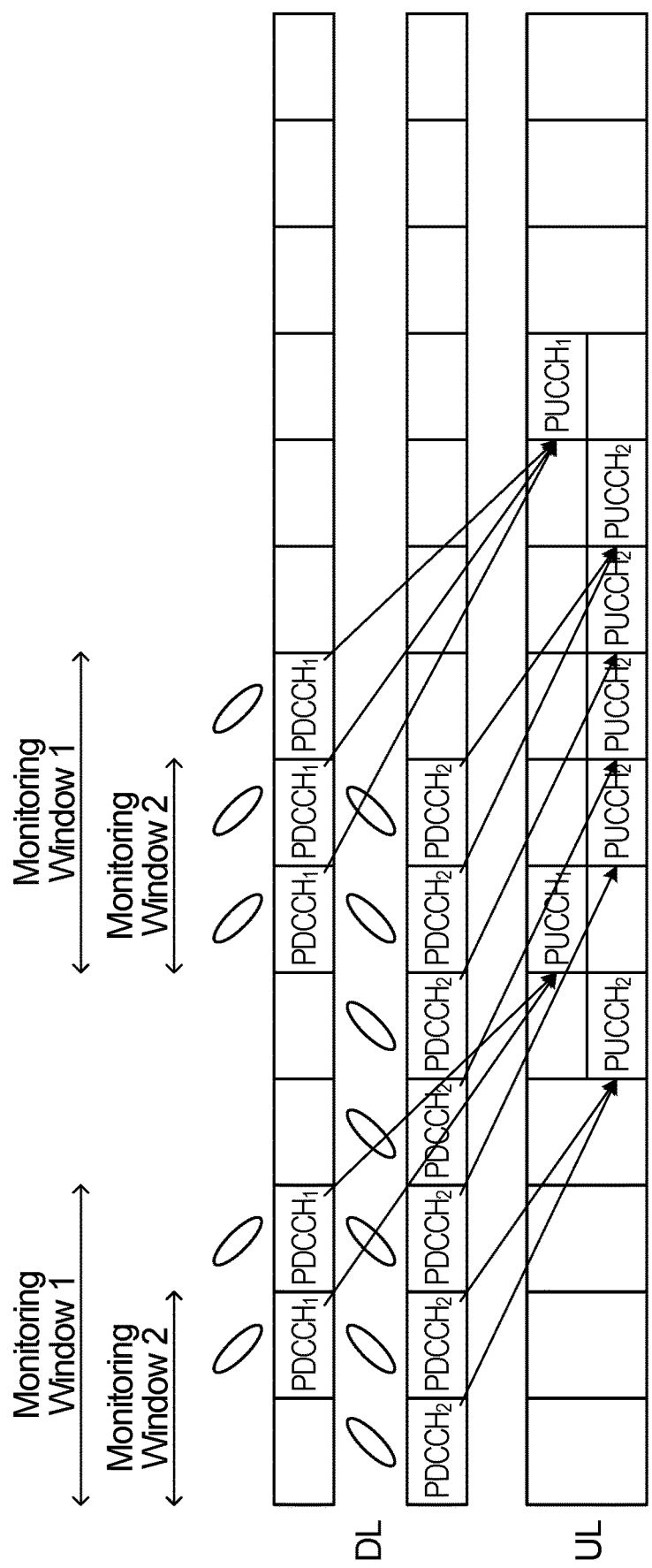
FIG. 12 shows an example of UCI combining in which the UE combines UCI formats for received downlink assignments that have the same value of beam information identity using a respective monitoring window for each value of the beam information.

In the above example, monitoring windows are defined for each value of the PDCCH identity property. The same approach can be applied for other assignment properties. Another specific example that involves UCI combining based on beam information is shown in FIG. 12, in which the UE is configured with 2 monitoring windows 710,712, one for each of two QCLs. Other than the assignment property being QCL instead of PDCCH identify, FIG. 12 is the same as FIG. 11, and as such will not be described again.

Monitoring Window not Specific to One Value of Assignment Property

In another embodiment, a UE is configuring with one monitoring window, which may again have properties such as starting slot, ending slot, offset, periodicity, and may again be defined using other granularities. The single monitoring window is not specific to a single value of an assignment property. Rather, in some embodiments, the same window is used for all values of an assignment property, or for a set of properties of an assignment property.

Figure 13:
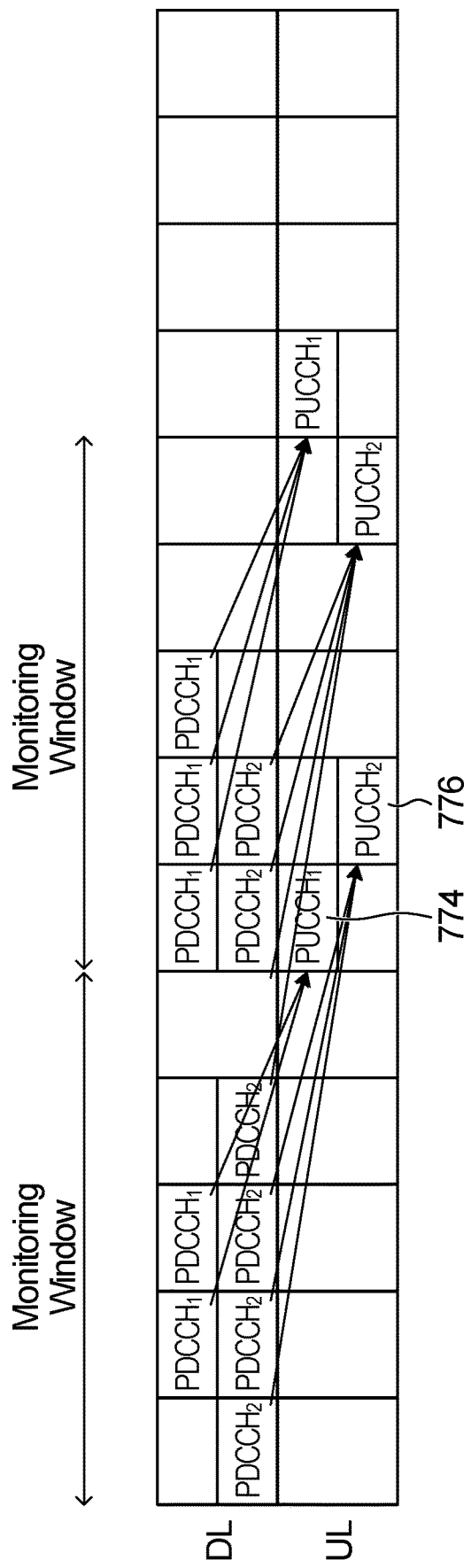
FIG. 13 shows an example of UCI combining in which the UE combines UCI formats for received downlink assignments that have the same value of PDCCH identity using a monitoring window that is common to multiple values of the PDCCH identity.

A specific example is shown in FIG. 13. In this example, the UE is configured with 1 monitoring window as follows:
  mt_starting_slot=0;
  mt_ending_slot=4;
  mt_periodicity=5;
  mt_offset=0;
  mt_property={PDCCH$_1$; PDCCH$_2$}
The last parameter mt_property is a vector carrying values of the PDCCH identities whose assignments the UE should combine UCIs to produce respective combined UCIs (one for each PDCCH identity included in the vector) within the defined monitoring window.

The expected UE behavior is as follows:
  a) for any assignment(s) whose property is PDCCH$_1$ received in Monitoring Window, the UE is to combine the UCI(s) and report in same PUCCH$_1$
  b) for any assignment(s) whose property is PDCCH$_1$ not received in Monitoring Window, the UE is to report the UCI(s) in separate/independent PUCCH$_1$
  c) for any assignment(s) whose property is PDCCH$_2$ received in Monitoring Window, the UE is to combine the UCI(s) and report in same PUCCH$_2$
  d) for any assignment(s) whose property is PDCCH$_2$ not received in Monitoring Window, the UE is to report the UCI(s) in separate/independent PUCCH$_2$ In the example of FIG. 13, there is a single monitoring window definition with of size 5, and shown are two instances of the defined monitoring window 770,772. In the first instance 770, the UE receives two assignments with PDCCH identity PDCCH$_1$ and four assignments with PDCCH identity PDCCH$_2$. The UE reports a respective combined UCI for each set of assignments. Shown is a combined UCI 774 (PUCCH$_1$) and a combined UCI 776 (PUCCH$_2$).

This embodiment provides a method whereby the UE is able to transmit uplink feedback signaling, in the case of simultaneous multiple downlink assignment reception, over PUCCHs. Different TRPs schedule downlink transmissions independently from each-other but the use of monitoring windows allows the network to control the UE behavior for UCI combining in a semi-static manner which can be operated in deployments with non-ideal backhaul.

The fact that a monitoring window is configured leads the UE (which is configured to simultaneously receive multiple downlink assignments) to behave in a way where it combines UCIs for assignments with a given value of an assignment property received during the monitoring window and transmit the corresponding combined UCI in a reporting occasion where the TRP expects to receive uplink signaling from the UE. The same approach can be employed to define a single monitoring window for combining based on other assignment properties.

In this embodiment, the UE is configured with a monitoring window that is not specific to a single value of an assignment property.

Monitoring Window and Reporting Window

In another embodiment, the UE is configured with one monitoring window and one reporting window. The monitoring window may be configured as described in previous examples, and many include a property vector carrying values of the PDCCH identities (or values of some other property) whose assignments received within the window the UE should produce respective combined UCIs. The reporting window may be configured in a similar manner, and my include a property vector carrying values of the PDCCH identities whose combined UCIs should be transmitted during the reporting window. The reporting window may also include a reporting window vector indicating specific locations within the reporting window that the UE is allowed to transmit combined UCIs for each PDCCH identity.

Figure K shows a specific example of this approach where the property vector is based on PDCCH identity. The UE is configured with one monitoring window:
mt_starting_slot=0;
mt_ending_slot=4;
mt_periodicity=5;
mt_offset=0;
mt_property={PDCCH$_1$; PDCCH$_2$}
The UE is configured with one reporting window:
rp_starting_slot=0;
rp_ending_slot=4;
rp_periodicity=5;
rp_offset=2;
rp_property={PDCCH$_1$; PDCCH$_2$};
rp_window={PDCCH$_1$, PDCCH$_2$, PDCCH$_1$, PDCCH$_2$, PDCCH$_1$}
where rp_window is the above introduced property window vector which indicates that within a window containing five slots numbered 0 to 4, slots 0, 2 and 4 (within a given reporting window) are available for combined UCI transmission for assignments with PDCCH$_1$, and slots 1 and 3 (within a given reporting window) are available for combined UCI transmission for assignments with PDCCH$_2$.

The UE behavior is as follows:

For any assignment(s) whose property is PDCCH$_1$ received in Monitoring Window, the UE is to combine the corresponding UCI(s) and report in same PUCCH$_1$ over first available reporting occasion for PDCCH$_1$ in Reporting Window;

For any assignment(s) whose property is PDCCH$_2$ received in Monitoring Window, the UE is to combine the corresponding UCI(s) and report in same PUCCH$_2$ over first available reporting occasion for PDCCH$_2$ in Reporting Window.

Figure 14:
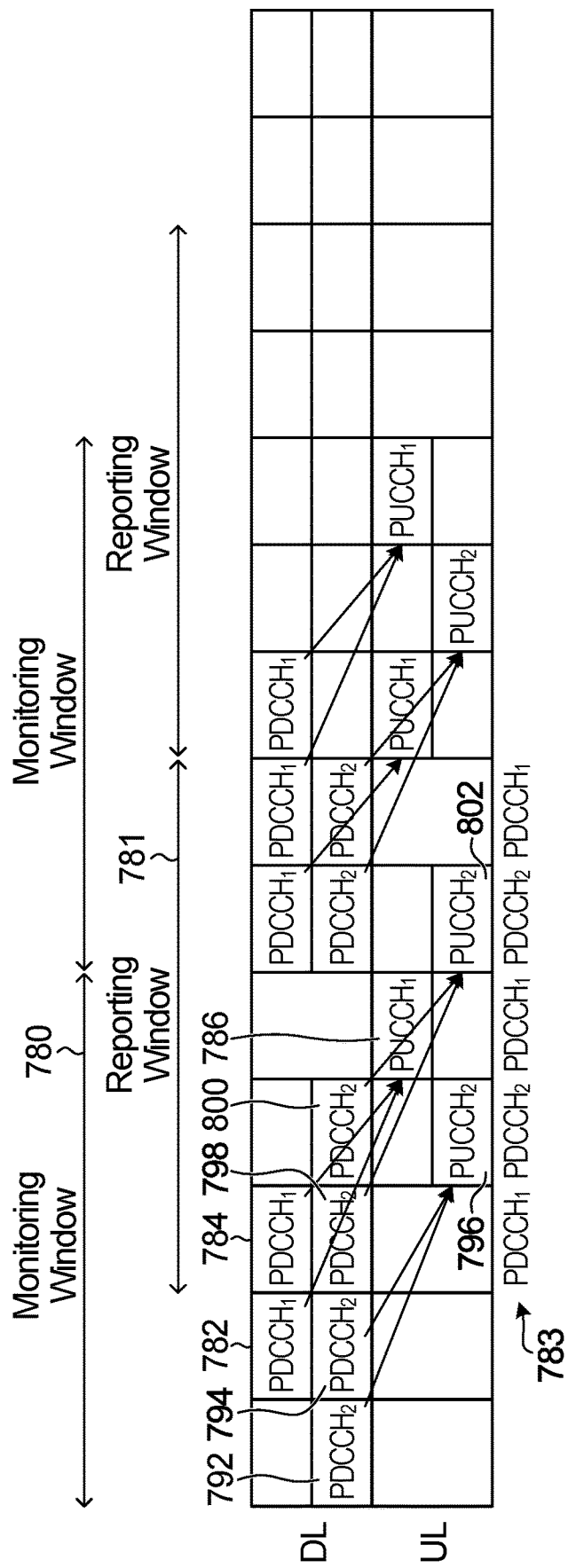
FIG. 14 shows an example of UCI combining in which the UE combines UCI formats for received downlink assignments that have the same value of PDCCH identity using a monitoring window that is common to multiple values of the PDCCH identity, in which UCI reporting occasions are defined within a reporting window.

In the example of FIG. 14, shown is a 5 slot monitoring window 780 and a 5 slot reporting window 781. The reporting occasions for each PDCCH identity are indicated at 783. Within the monitoring window 780, shown are assignments 782,784 for PDCCH$_1$. A combined UCI 786 is transmitted in the first available reporting occasion (the 3$^{rd}$ slot of the reporting window 781). Also shown are assignments 792,794,796,798 for PDCCH$_2$. There is a reporting occasion in the second slot of the reporting window. This is used to transmit a combined UCI 796 in respect of assignments 792,794. There is a reporting occasion in the fourth slot of the reporting window. This is used to transmit a combined UCI 798 in respect of assignments 798,798.

This embodiment provides a method whereby the UE is able to transmit uplink feedback signaling, in the case of simultaneous multiple downlink assignment reception, over PUCCHs. Different TRPs schedule downlink transmissions independently from each-other but the use of monitoring and reporting windows allows the network to control the UE behavior in a semi-static manner which can be operated in deployments with non-ideal backhaul.

The fact that monitoring and reporting windows are configured leads the UE (which is configured to simultaneously receive multiple downlink assignments) to behave in a way where it combines UCIs for assignments with a given property and transmit the corresponding combined UCI in a reporting occasion where the TRP expects to receive uplink signaling from the UE.

Figure 15:
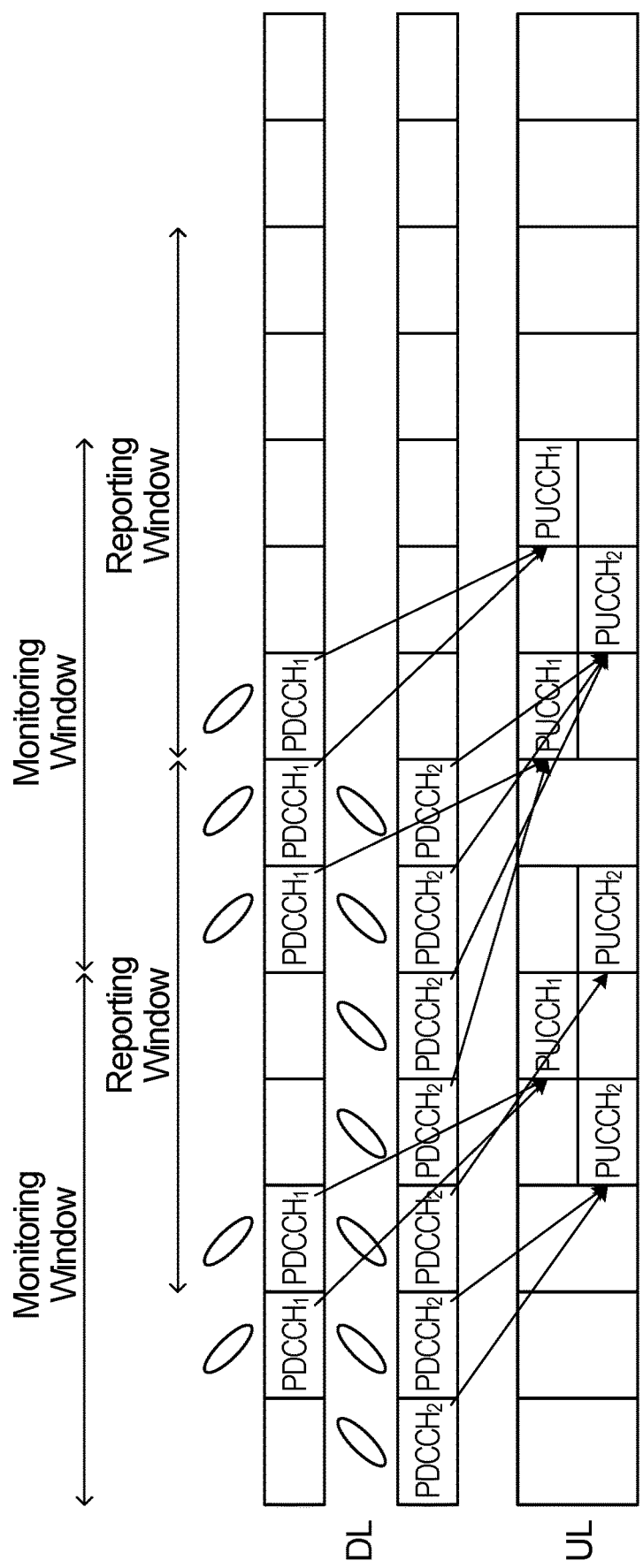
FIG. 15 shows an example of UCI combining in which the UE combines UCI formats for received downlink assignments that have the same value of beam information identity using a monitoring window that is common to multiple values of the beam information, in which UCI reporting occasions are defined within a reporting window.

FIG. 15 shows an example which is the same as FIG. 14, except that the UCI combining is performed in respect of assignments having the same beam information. The same approach can be applied for other properties such as CORE-SET identity.

Hybrid PUCCH/PUSCH for Combined UCI Transmission—Single PUSCH Capability

In some embodiments, the UE is configured to transmit combined UCI on the PUCCH and/or the PUSCH.

As in the above example, the UE is configured with one monitoring window and one reporting window. The monitoring window and reporting window are each configured with a property vector as described above, and the reporting window is configured with a reporting window vector as detailed above, indicating which slots are for reporting in respect of which PDCCH identity. As before, other granularities can be used.

In one embodiment, the UE behavior is as follows:
For every assignment received within the monitoring window whose property is PDCCH$_1$, the UE combines the UCIs corresponding to the assignments whose property is PDCCH$_1$ into a combined UCI. The monitoring window has an associated reporting window for transmitting a combined UCI on a PUCCH transmission in defined reporting occasions within the monitoring window. If the UE receives an uplink grant scheduling an uplink data transmission that takes place in the same reporting window and its PDCCH identity is $PDCCH_1$, then the UE multiplexes or piggy-backs the combined UCI over the corresponding PUSCH transmission. Otherwise, the UE transmits the combined UCI over a PUCCH transmission in a reporting occasion where the TRP expects to receive uplink signaling from the UE. If the UE only has the capability of transmitting only one PUSCH in a given slot, to address the situation where the UE receives two uplink grants in the same monitoring occasion, the UE is configured to drop one PUSCH transmission because the transmission of 2 PUSCH in the same occasion is beyond the UE's capability. In this embodiment, a dropping rule may be implemented that instructs the UE to drop the PUSCH transmission carrying a combined UCI with the smallest combined UCI payload (i.e. the combined UCI that is in respect of the smaller number of constituent UCIs);

A corresponding approach is applied for assignments received within the monitoring window whose property is $PDCCH_2$.

Figure 16:
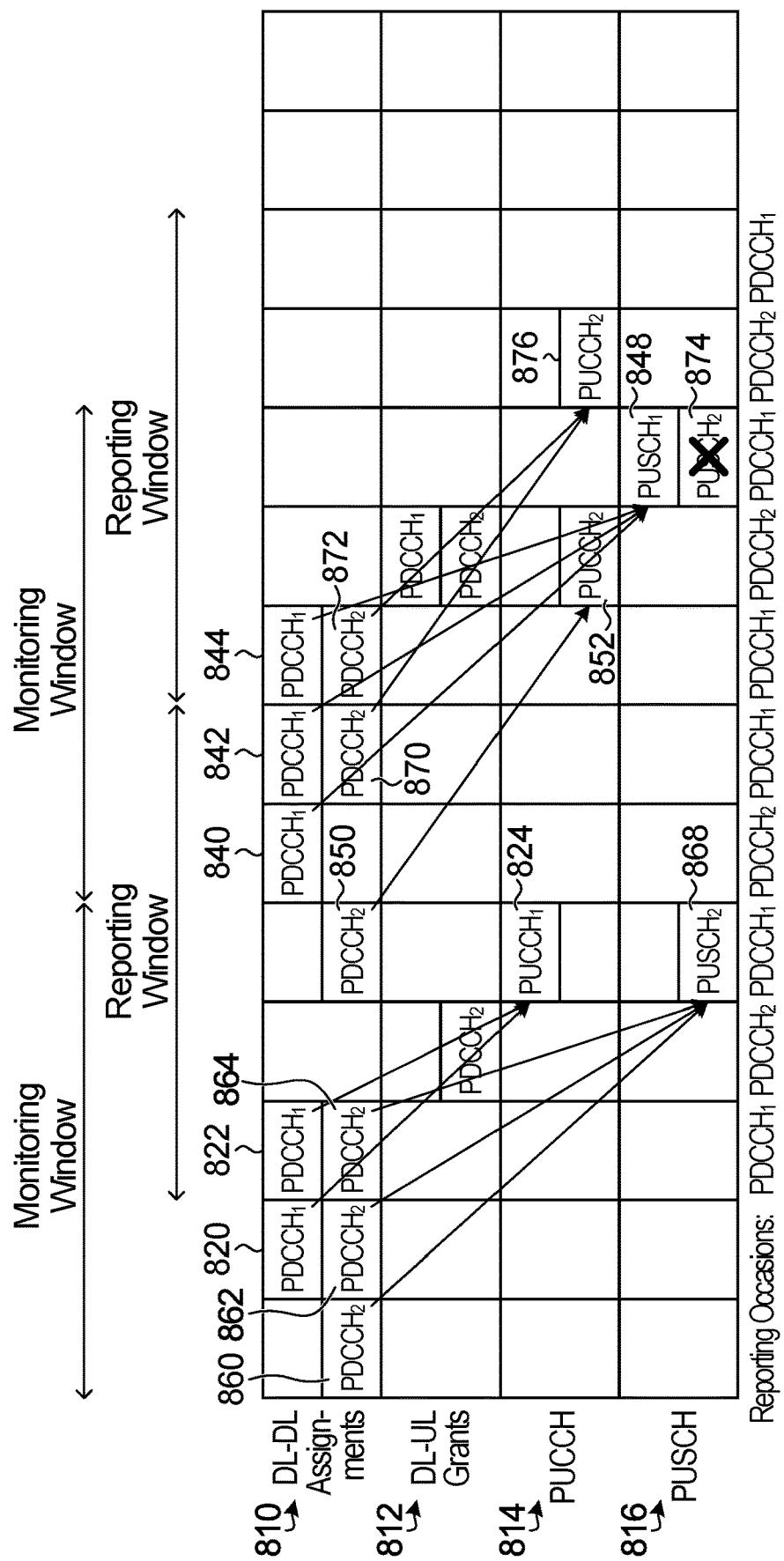
FIG. 16 shows an example of UCI combining where the UE has the option of transmitting the combined UCI on a PUCCH or PUSCH if available, but is constrained to transmit a single PUSCH per reporting occasion.

An example is shown in FIG. 16. FIG. 16 shows grants transmitted on the downlink in respect of downlink transmission (DL-DL assignments) 810, grants transmitted on the downlink in respect of uplink transmission (DL-UL grants) 812, PUCCH 814 and PUSCH 816. There is a $PDCCH_2$ grant transmitted in the fourth slot for PUSCH transmission in the fifth slot, and $PDCCH_1$ and $PDCCH_2$ grants transmitted in the ninth slot for $PUSCH_1$ and $PUSCH_2$ transmission in the $10^{th}$ slot. For this example, the UE is configured with a monitoring window:

mt_starting_slot=0;
mt_ending_slot=4;
mt_periodicity=5;
mt_offset=0;
mt_property={$pdcch_1$; $pdcch_2$}

The UE is also configured with a reporting window:

rp_starting_slot=0;
rp_ending_slot=4;
rp_periodicity=5;
rp_offset=2;
rp_property={$pdcch_1$; $pdcch_2$};
rp_window={$pdcch_1$, $pdcch_2$, $pdcch_1$, $pdcch_2$, $pdcch_1$}

For assignments whose property is $PDCCH_n$ received in Monitoring Window and no UL grant received in Monitoring Window, the UE will combine UCIs and report in same $PUCCH_n$ in earliest reporting occasion. An example of this behavior in FIG. 16 is the transmission of combined UCI using PUCCH transmission 824 in respect of $PDCCH_1$ assignments 820,822. Another example is the transmission of UCI in respect of $PDCCH_2$ transmission 850 using $PUCCH_2$ 852, although in this case, it is not a combined UCI.

A first example of the piggy-backing behavior in FIG. 16 is the transmission of combined UCI in respect of $PDCCH_2$ assignments 860,862,864 using piggy-backing on $PUSCH_2$ transmission 868. $PUSCH_2$ transmission 868 is scheduled within in the reporting window in respect of $PDCCH_2$. So the $PUSCH_2$ is used for the combined UCI instead of $PUCCH_2$.

A second example of the piggy-backing behavior in FIG. 16 is the transmission of combined UCI in respect of $PDCCH_1$ assignments 840,842,844 using piggy-backing on $PUSCH_1$ transmission 848. $PUSCH_1$ transmission is scheduled in within the reporting window in respect of $PDCCH_1$. So the $PUSCH_1$ is used for the combined UCI instead of $PUCCH_1$. Using this logic, $PUSCH_2$ 874 would be used to transmit a combined UCI in respect of $PDCCH_2$ assignments 872,874. However, for a UE that cannot transmit simultaneous PUSCH transmissions, this is not possible. In this example, the $PUSCH_1$ transmission 848 takes precedence because it has 3 piggy-backed UCIs compared to 2 for possible $PUSCH_2$ transmission 874. The combined UCI for $PDCCH_2$ assignments 872,874 is transmitted using $PUCCH_2$ 876 in a defined reporting occasion.

A specific priority rule has been described but other priority rules are possible. For example, one or more priority rules may be implemented that involve:

selecting between a PUCCH/PUSCH transmission for sending UCIs;
dropping a PUCCH/PUSCH transmission if there is any kind of overlap between different UL transmissions;
dropping a PUCCH/PUSCH transmission because it is beyond the UE's capability to do so;
Other rules.

This embodiment provides a method whereby the UE is able to transmit uplink feedback signaling, in the case of simultaneous multiple downlink assignment reception, over PUCCHs or PUSCHs. Different TRPs schedule downlink transmissions independently from each-other but the use of monitoring and reporting windows allows the network to control the UE behavior in a semi-static manner which can be operated in deployments with non-ideal backhaul.

The fact that monitoring and reporting windows are configured leads the UE, which is configured to simultaneously receive multiple downlink assignments, to behave in a way where it combines UCIs for assignments of a given property and transmit the corresponding combined UCI in a reporting occasion where the TRP expects to receive uplink signaling from the UE. In this embodiment, the UE can also use the extra degree of freedom provided by uplink grants scheduling uplink data transmissions to transmit UCIs in association with PUSCH transmission. This may also involve the configuration of priority rules whereby the UE can decide to drop a PUCCH or PUSCH transmission if it were to collide or overlap in some domain (such as time, frequency, code, layer, etc. . . . ) or if such a transmission exceeds the UE's capability.

Hybrid PUCCH/PUSCH for Combined UCI Transmission—Multiple PUSCH Capability

Figure 17:
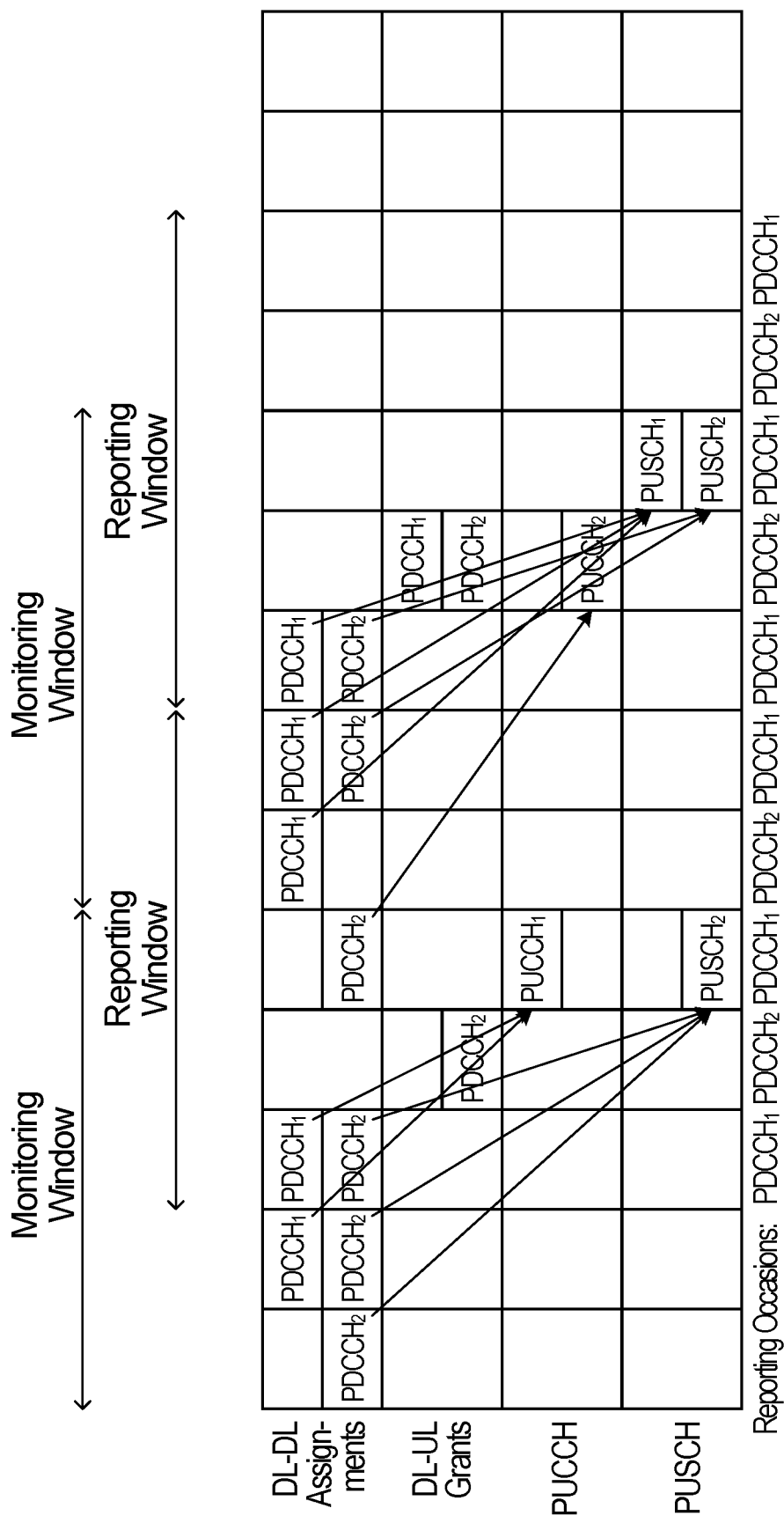
FIG. 17 shows an example of UCI combining where the UE has the option of transmitting the combined UCI on a PUCCH or PUSCH if available, and is able to transmit multiple PUSCH per reporting occasion.

In another embodiment, substantially the same approach as described above for hybrid PUCCH/PUSCH for combined UCI transmission, but for a UE that has the capability of multiple simultaneous PUSCH transmission. In this case, where two PUSCH transmissions are scheduled in the same slot, these can both be transmitted, and in addition, these PUSCH transmissions are available for piggy-backing or multiplexing combined UCIs. An example is shown in FIG. 17 which is the same as FIG. 16 except that both PUSCH transmissions can occur in the $10^{th}$ slot, and the PUSCH2 transmission can be used for combined UCI transmission in the $10^{th}$ slot instead of waiting for the PUCCH opportunity in the $11^{th}$ slot as was the case in the example of FIG. 16.

Detailed Signaling Examples for Multiple Downlink Assignment Configuration and Uplink Feedback Configuration and Corresponding UE Behavior The UE is configured using a higher-layer signaling message (e.g. RRC, MAC-CE) carrying information that the UE uses to perform tasks it needs to do as part of being connected to the network. The UE may follow procedures to process and/or store the information carried in the higher-layer signaling message in some form in its internal memory. In the following embodiments, the UE may follow procedures to process and/or store information carried in the higher-layer signaling message in response to receiving a higher-layer signaling message.

The UE is configured with a higher-layer signaling message (e.g. RRC, MAC-CE) carrying information about one or more downlink assignment configurations and/or one or more uplink feedback configurations. The respective downlink assignment configurations and/or uplink feedback configurations may include information that is cell-specific or user-specific. The configuration of respective downlink assignment configurations with information such as assignment property and monitoring window triggers the UE to find assignments for which to combine uplink feedback reporting. The configuration of respective uplink feedback configurations with information such as assignment property and reporting window triggers the UE to report uplink feedback for each assignment type.

Assignment property can be characterized with at least one of the following:
  An assignment property type, signaling the type of the property the UE will monitor downlink assignments for (e.g. a PDCCH identity, a CORESET identity, a QCL value, a HARQ entity identity, etc.)
  An assignment property value, signaling the value of the property the UE will use to identify any one or more downlink assignments it is monitoring.

In some embodiments, assignment property type can be specified in an explicit or an implicit manner.

In some embodiments, the UE is configured using a higher-layer signaling message (e.g. RRC, MAC-CE) with information about respective downlink assignment configurations. The respective downlink assignment configurations may include information that is cell-specific or user-specific. Downlink assignment configuration can include information about at least one or more of the following (not precluding information about other fields):
  Information consisting of one or more Control Resource Sets,
  Information consisting of one or more Search Spaces,
  A monitoring window consisting of at least an assignment property field (e.g. a PDCCH identity, a CORESET identity, a QCL value, etc.).

In some embodiments, the UE is configured using a higher-layer signaling message (e.g. RRC, MAC-CE) with information about respective downlink assignment configurations and information about a monitoring window. The respective downlink assignment configurations may include information that is cell-specific or user-specific. Downlink assignment configuration can include information about at least one or more of the following (not precluding information about other fields):
  Information consisting of one or more Control Resource Sets,
  Information consisting of one or more Search Spaces,
  An assignment property field (e.g. a PDCCH identity, a CORESET identity, a QCL value, etc.).

In some other embodiments, the UE is configured using a higher-layer signaling message (e.g. RRC, MAC-CE) with information about each respective uplink feedback configuration. The respective uplink feedback configurations may include information that is cell-specific or user-specific. Uplink feedback configuration can include information about any one or more of the following (not precluding information about other fields):
  Information consisting of one or more Uplink Resource Sets,
  Information consisting of one or more Uplink Resources,
  A reporting window consisting of at least an assignment property field (e.g. a PDCCH identity, a CORESET identity, a QCL value, etc.).

In some other embodiments, the UE is configured using a higher-layer signaling message (e.g. RRC, MAC-CE) with information about each respective uplink feedback configuration and information about a reporting window. The respective uplink feedback configurations may include information that is cell-specific or user-specific. Uplink feedback configuration can include information about any one or more of the following (not precluding information about other fields):
  Information consisting of one or more Uplink Resource Sets,
  Information consisting of one or more Uplink Resources,
  An assignment property field (e.g. a PDCCH identity, a CORESET identity, a QCL value, etc.).

In some other embodiments, there is a linkage between a respective downlink assignment configuration and a respective uplink feedback configuration. The linkage allows the UE to determine which uplink feedback configuration to use for transmitting uplink feedback signaling corresponding to a respective data transmission associated to a respective downlink assignment. The UE mechanism for determining the linkage between a respective downlink assignment configuration and a respective uplink feedback configuration may be explicitly signaled or implicitly derived.

An embodiment of an explicit mechanism establishing a linkage between a respective downlink assignment configuration and a respective uplink feedback configuration is as follows: the UE is configured with a higher-layer signaling message (e.g. RRC, MAC-CE) with information establishing a linkage between a respective downlink assignment configuration and a respective uplink feedback configuration by carrying a tuple consisting of those respective downlink assignment and uplink feedback configurations. A UE considers a downlink assignment configuration to be linked with an uplink feedback configuration if the downlink assignment configuration and uplink feedback configuration objects are part of the same tuple. Otherwise, the UE does not consider a downlink assignment configuration to be linked with any uplink feedback configuration.

Another embodiment of an explicit mechanism establishing a linkage between a respective downlink assignment configuration and a respective uplink feedback configuration is as follows: the UE is configured with a higher-layer signaling message (e.g. RRC, MAC-CE) with information about one or more respective downlink assignment configurations and one or more respective uplink feedback configurations. The one or more respective downlink assignment configurations contain a field which explicitly refers to a given uplink feedback configuration. The uplink feedback configuration may be part of the higher-layer signaling message received by the UE or may already exist at the UE. A UE considers a downlink assignment configuration to be linked with an uplink feedback configuration if the downlink assignment configuration carries a reference to an uplink feedback configuration. Otherwise, the UE does not consider a downlink assignment configuration to be linked with any uplink feedback configuration.

Another embodiment of an explicit mechanism establishing a linkage between a respective downlink assignment configuration and a respective uplink feedback configuration is as follows: the UE is configured with a higher-layer signaling message (e.g. RRC, MAC-CE) with information about one or more respective downlink assignment configurations and one or more respective uplink feedback configurations. The one or more respective uplink feedback configurations contain a field which explicitly refers to a given downlink assignment configuration. The downlink assignment configuration may be part of the higher-layer signaling message received by the UE or may already exist in the UE's configuration. A UE considers a downlink assignment configuration to be linked with an uplink feedback configuration if the uplink feedback configuration carries a reference to a downlink assignment configuration. Otherwise, the UE does not consider an uplink feedback configuration to be linked with any downlink assignment configuration.

Another embodiment of an explicit mechanism establishing a linkage between a respective downlink assignment configuration and a respective uplink feedback configuration is as follows: the UE is configured with a higher-layer signaling message (e.g. RRC, MAC-CE) with information about one or more respective downlink assignment configurations and one or more respective uplink feedback configurations. The one or more respective downlink assignment configurations contain a field which explicitly refers to a given uplink feedback configuration. The one or more respective uplink feedback configurations contain a field which explicitly refers to a given downlink assignment configuration. The one or more downlink assignment configurations and the one or more uplink feedback configurations may be part of the higher-layer signaling message received by the UE or may already exist in the UE's configuration. A UE considers a downlink assignment configuration to be linked with an uplink feedback configuration if the downlink assignment configuration and the uplink feedback configuration carry a reference to each-other.

An embodiment of an implicit mechanism establishing a linkage between a respective downlink assignment configuration and a respective uplink feedback configuration is as follows: the UE is configured with a higher-layer signaling message (e.g. RRC, MAC-CE) with information about one or more respective downlink assignment configurations and one or more respective uplink feedback configurations. A UE considers a downlink assignment configuration to be linked with an uplink feedback configuration if the downlink assignment and uplink feedback configurations specify the same assignment property type (e.g. a PDCCH identity, a CORESET identity, a QCL information, etc.) and if the values set for their respective assignment properties are equal. A UE does not consider a downlink assignment configuration to be linked with an uplink feedback configuration if the downlink assignment configuration and an uplink feedback configuration do not specify the same assignment property type or if the values set for their respective assignment properties are not equal.

Another embodiment of an implicit mechanism establishing a linkage between a respective downlink assignment configuration and a respective uplink feedback configuration is as follows: the UE is configured with a higher-layer signaling message (e.g. RRC, MAC-CE) with information about one or more respective downlink assignment configurations and one or more respective uplink feedback configurations. A UE considers a downlink assignment configuration to be linked with an uplink feedback configuration if both configurations are defined in the same parent object of the higher-layer signaling message. Otherwise, a UE does not consider a downlink assignment configuration to be linked with an uplink feedback configuration.

Another embodiment of an implicit mechanism establishing a linkage between a respective downlink assignment configuration and a respective uplink feedback configuration is as follows: the UE is configured with a higher-layer signaling message (e.g. RRC, MAC-CE) with information about one or more respective downlink assignment configurations, one or more respective downlink data configurations and one or more respective uplink feedback configurations. The downlink assignment configuration and downlink data configuration are implicitly linked to each-other by virtue of being defined in the same parent object. The uplink feedback configuration contains a field which explicitly refers to a given downlink data configuration. A UE considers a downlink assignment configuration to be linked with an uplink feedback configuration if the uplink feedback configuration carries a reference to a downlink data configuration linked to that downlink assignment configuration. Otherwise, the UE does not consider the downlink assignment configuration to be linked with the uplink feedback configuration.

Other embodiments of explicit or implicit mechanisms establishing a linkage between a respective downlink assignment configuration and a respective uplink feedback configuration can be based on a combination of one or more of the mechanisms described in the previous embodiments.

Network Behavior

In a network deployment where TRPs belonging to the same cell or different cells experience non-ideal backhaul delay, the network can configure a UE to monitor for and receive one or more downlink assignments in the same monitoring occasion. The network can also configure the UE to report any uplink feedback corresponding to the one or more downlink data transmissions scheduled by the corresponding one or more downlink assignments by combining the uplink feedback signaling corresponding to the one or more downlink data transmissions together. The network can transmit a higher-layer signaling message (e.g. RRC, MAC-CE) carrying configuration for the one or more downlink assignments.

In a network deployment where TRPs belonging to the same cell or different cells experience non-ideal backhaul delay, the network can configure a UE to monitor for and receive downlink assignments from one or more TRPs in the same monitoring. The network can also configure the UE to report any uplink feedback corresponding to the one or more downlink assignments in a combined manner or in an independent manner depending on the non-ideal backhaul conditions experienced by TRPs. The combining reporting is performed as described in embodiments described herein.

The scheduling decision by the network to configure a UE via a higher-layer signaling message with one or more downlink assignments configuration objects can be taken based on aspects and metrics such as non-ideal backhaul delay, traffic load management metrics, user quality of service metrics, user quality of experience metrics, traffic data sharing between TRPs, CSI data sharing between TRPs.

The scheduling decision by the network to configure a UE via a higher-layer signaling message with one or more uplink feedback configuration objects can be taken based on aspects and metrics such as non-ideal backhaul delay, traffic load management metrics, quality of service related metrics, quality of experience related metrics, traffic data sharing between TRPs, CSI data sharing between TRPs.

In a network deployment where TRPs belonging to the same cell or different cells are connected through ideal or close-to-ideal backhaul, the network can configure a UE to monitor for and receive downlink assignments from one or more TRPs in the same monitoring occasion. The network can also configure the UE to report any uplink feedback corresponding to the one or more downlink assignments in a combined manner. The combined form of uplink feedback reporting is performed as in embodiments described herein. The UE is provided uplink feedback configuration to feedback UCIs of assignments of interest (e.g. for downlink assignments from the same TRP or different TRPs). The network can configure the UE to report UCIs for assignments from the same TRP or from different TRPs on a dynamic basis, a semi-static basis or a slow/long-term basis.

In a network deployment where TRPs belonging to the same cell or different cells are connected through non-ideal backhaul preventing any kind of dynamic or semi-static exchange of information, the network can configure a UE to monitor for and receive downlink assignments from one or more TRPs in the same monitoring occasion. The network can also configure the UE to report any uplink feedback corresponding to the one or more downlink assignments in a combined manner or in an independent manner. The combined form of uplink feedback reporting is performed as in embodiments described herein. The independent form of uplink feedback reporting is performed such that the UE transmits a UCI for each downlink assignment received in a given monitoring occasion. The network can switch from the combined form of reporting and independent form of reporting on a dynamic basis, a semi-static basis or a slow/long-term basis.

In a network deployment where TRPs belonging to the same cell or different cells are connected through non-ideal backhaul preventing dynamic exchange of scheduling decisions but allowing semi-static exchange of CSI information, the network can configure a UE to monitor for and receive downlink assignments from one or more TRPs in the same monitoring occasion. The network can also configure the UE to report any uplink feedback corresponding to the one or more downlink assignments in a combined manner or in an independent manner. The combined form of uplink feedback reporting is performed in embodiments described herein. The independent form of uplink feedback reporting is performed such that the UE transmits a UCI for each downlink assignment received in a given monitoring occasion. The network can switch from the combined form of reporting and independent form of reporting on a dynamic basis, a semi-static basis or a slow/long-term basis.

Numerous modifications and variations of the present disclosure are possible in light of the above teachings. It is therefore to be understood that within the scope of the appended claims, the disclosure may be practiced otherwise than as specifically described herein.

The invention claimed is:

1. A method in a user equipment (UE), the method comprising:
   receiving a first plurality of downlink assignments, wherein each downlink assignment of the first plurality of downlink assignments schedules a respective downlink data transmission and all the first plurality of downlink assignments are associated with a control resource set (CORESET) having a CORESET identity of a first value; and
   receiving a second plurality of downlink assignments, wherein each downlink assignment of the second plurality of downlink assignments schedules a respective downlink data transmission and all the second plurality of downlink assignments are associated with a CORESET having a CORESET identity of a second value different than the first value;
   wherein the CORESET having the CORESET identity of the first value and the CORESET having the CORESET identity of the second value belong to a same cell;
   transmitting first uplink control information (UCI) for the first plurality of downlink assignments on a first physical uplink control channel (PUCCH), the first UCI comprising first hybrid automatic repeat request (HARQ) acknowledgement (ACK)/negative acknowledgement (NACK) information for each downlink assignment of the first plurality of downlink assignments; and
   transmitting second UCI for the second plurality of downlink assignments on a second PUCCH that is different than the first PUCCH, the second UCI comprising a second HARQ ACK/NACK information for each downlink assignment of the second plurality of downlink assignments;
   monitoring for the first plurality of downlink assignments during a first monitoring window and monitoring for the second plurality of downlink assignments during a second monitoring window;
   wherein the first UCI comprising the first HARQ ACK/NACK information for each downlink assignment of the first plurality of downlink assignments that is received during the first monitoring window;
   the second UCI comprising the second HARQ ACK/NACK information for each downlink assignment of the second plurality of downlink assignments that is received during the second monitoring window.

2. The method of claim 1 comprising:
   receiving, for each monitoring window of the first and second monitoring windows, a configuration of the monitoring window that configures the UE with the monitoring window using parameters that are based on a granularity, wherein the parameters comprise one or a combination of:
   a value of CORESET identity that the monitoring window applies to;
   start;
   end;
   duration;
   offset; and
   periodicity.

3. The method of claim 1 wherein:
   the first UCI comprising first HARQ ACK/NACK information for each downlink assignment of the first plurality of downlink assignments comprises a first combined HARQ ACK/NACK field comprising a respective HARQ ACK/NACK field for each respective downlink assignment of the first plurality of downlink assignments;
   the second UCI comprising second HARQ ACK/NACK information for each downlink assignment of the second plurality of downlink assignments comprises a second combined HARQ ACK/NACK field comprising comprises a respective HARQ ACK/NACK field for each respective downlink assignment of the second plurality of downlink assignments.

4. The method of claim 1 further comprising:
   generating the first UCI by multiplexing constituent UCIs for each respective downlink assignment of the first plurality of downlink assignments, each constituent UCI comprising one or more of:
   a respective HARQ ACK/NACK field;
   a respective scheduling request (SR) field; and
   a respective channel state information (CSI).

5. The method of claim 1, wherein the first UCI comprising the first HARQ ACK/NACK information for each respective downlink assignment of the first plurality of downlink assignments and the second UCI comprising the second HARQ ACK/NACK information for each respective downlink assignment of the second plurality of downlink assignments are transmitted in different occasions.

6. The method of claim 5, wherein each occasion includes one of a slot, an OFDM symbol, or a group of OFDM symbols.

7. The method of claim 1, wherein the CORESET having the CORESET identity of the first value is associated with a first transmit receive point (TRP), and the CORESET having the CORESET identity of the second value is associated with second TRP different than the first TRP.

8. A method in a base station (BS), the method comprising:
- transmitting to a user equipment (UE) a first plurality of downlink assignments, wherein each downlink assignment of the first plurality of downlink assignments schedules a respective downlink data transmission and all the first plurality of downlink assignments are associated with a control resource set (CORESET) having a CORESET identity of a first value;
- transmitting a second plurality of downlink assignments, wherein each downlink assignment of the second plurality of downlink assignments schedules a respective downlink data transmission and all the second plurality of downlink assignments are associated with a CORESET having a CORESET identity of a second value different than the first value;
- wherein the CORESET having the CORESET identity of the first value and the CORESET having the CORESET identity of the second value are belong to a same cell;
- receiving from the UE first uplink control information (UCI) for the first plurality of downlink assignments on a first physical uplink control channel (PUCCH), the first UCI comprising first hybrid automatic repeat request (HARQ) acknowledgement (ACK)/negative acknowledgement (NACK) information for each respective downlink assignment of the first plurality of downlink assignments; and
- receiving from the UE second UCI for the second plurality of downlink assignments on a second PUCCH that is different than the first PUCCH, the second UCI comprising a second HARQ ACK/NACK information for each downlink assignment of the second plurality of downlink assignments;
- wherein:
- the first UCI comprising the HARQ ACK/NACK information for each downlink assignment of the first plurality of downlink assignments that is transmitted during a first monitoring window;
- the second UCI comprising the second HARQ ACK/NACK information for each downlink assignment of the second plurality of downlink assignments that is transmitted during a second monitoring window.

9. The method of claim 8 comprising:
- transmitting, for each monitoring window of the first monitoring window and the second monitoring window, a configuration of the monitoring window that configures the UE with the monitoring window using parameters that are based on a granularity, wherein the parameters comprise one or a combination of:
- a value of the CORESET identity that the monitoring window applies to;
- start;
- end;
- duration;
- offset; and
- periodicity.

10. The method of claim 8, wherein the first UCI comprising the first HARQ ACK/NAK information for each respective downlink assignment of the first plurality of downlink assignments and the second UCI comprising the second HARQ ACK/NAK information for each respective downlink assignment of the second plurality of downlink assignments are transmitted in different occasions.

11. The method of claim 10, wherein each occasion includes one of a slot, an OFDM symbol, or a group of OFDM symbols.

12. The method of claim 8, wherein the CORESET having the CORESET identity of the first value is associated with a first transmit receive point (TRP), and the CORESET having the CORESET identity of the second value is associated with second TRP different than the first TRP.

13. A user equipment (UE) comprising:
- one or more processors in communication with a memory storage comprising instructions, wherein the one or more processors execute the instructions to:
- receive a first plurality of downlink assignments, wherein each downlink assignment of the first plurality of downlink assignments schedules a respective downlink data transmission and all the first plurality of downlink assignments are associated with a control resource set (CORESET) having a CORESET identity of a first value;
- receive a second plurality of downlink assignments, wherein each downlink assignment of the second plurality of downlink assignments is associated with a CORSET having a CORESET identity of a second value different than the first value;
- wherein the CORESET having the CORESET identity of the first value and the CORESET having the CORESET identity of the second value belong to a same cell;
- transmit a first UCI for the plurality of downlink assignments on a first physical uplink control channel (PUCCH), the first UCI comprising first hybrid automatic repeat request (HARQ) acknowledgement (ACK)/negative acknowledgement (NAK) information for each downlink assignment of the first plurality of downlink assignments; and
- transmit second UCI for the second plurality of downlink assignments on a second PUCCH that is different than the first PUCCH, the second UCI comprising a second HARQ ACK/NAK information for each downlink assignment of the second plurality of downlink assignments;
- monitor for the first plurality of downlink assignments during a first monitoring window and monitoring for the second plurality of downlink assignments during a second monitoring window; and
- transmit the first UCI comprising first HARQ ACK/NACK information for each respective downlink assignment of the first plurality of downlink assignments during the first monitoring window;
- transmit the second UCI comprising second HARQ ACK/NACK information for each respective downlink assignment of the second plurality of downlink assignments during the second monitoring window.

14. The UE of claim 13, wherein the first UCI comprising the first HARQ ACK/NAK information for each respective downlink assignment of the first plurality of downlink assignments and the second UCI comprising the second HARQ ACK/NAK information for each respective downlink assignment of the second plurality of downlink assignments are transmitted in different occasions.

15. The UE of claim 14, wherein each occasion includes one of a slot, an OFDM symbol, or a group of OFDM symbols.

16. The UE of claim 13 wherein the one or more processors execute the instructions to:
receive, for each monitoring window of the first and second monitoring windows, a configuration of the monitoring window that configures the UE with the monitoring window using parameters that are based on a granularity, wherein the parameters comprise one or a combination of:
a value of CORESET identity that the monitoring window applies to;
start;
end;
duration;
offset; and
periodicity.

17. The UE of claim 13 wherein:
the first UCI comprising first HARQ ACK/NACK information for each downlink assignment of the first plurality of downlink assignments comprises a first combined HARQ ACK/NACK field comprising a respective HARQ ACK/NACK field for each respective downlink assignment of the first plurality of downlink assignments;
the second UCI comprising second HARQ ACK/NACK information for each downlink assignment of the second plurality of downlink assignments comprises a second combined HARQ ACK/NACK field comprising a respective HARQ ACK/NACK field for each respective downlink assignment of the second plurality of downlink assignments.

18. The UE of claim 13 wherein the one or more processors execute the instructions to:
generate the first UCI by multiplexing constituent UCIs for each respective downlink assignment of the first plurality of downlink assignments, each constituent UCI comprising one or more of:
a respective hybrid automatic repeat request (HARQ) acknowledgement (ACK)/negative acknowledgement (NAK) field;
a respective scheduling request (SR) field; and
a respective channel state information (CSI).

19. The user equipment of claim 13, wherein the CORESET having the CORESET identity of the first value is associated with a first transmit receive point (TRP), and the CORESET having the CORESET identity of the second value is associated with second TRP different than the first TRP.

20. A base station comprising:
one or more processors in communication with a memory storage comprising instructions, wherein the one or more processors execute the instructions to:
transmit a radio resource control signalling a plurality of control resource sets (CORESETs);
transmit a first plurality of downlink assignments, wherein each downlink assignment of the first plurality of downlink assignments schedules a respective downlink data transmission and all the first plurality of downlink assignments are associated with a control resource set (CORESET) of the plurality of CORESETs, the CORESET having a CORESET identity of a first value; and
transmit a second plurality of downlink assignments, wherein each downlink assignment of the second plurality of downlink assignments schedules a respective downlink data transmission and all the second plurality of downlink assignments are associated with a CORESET having a CORESET identity of a second value different than the first value;
wherein the CORESET having the CORESET identity of the first value and the CORESET having the CORESET identity of the second value are belong to a same cell;
receive first uplink control information (UCI) for the plurality of downlink assignments on a first physical uplink control channel (PUCCH), receiving the first UCI comprising:
receive first hybrid automatic repeat request (HARQ) acknowledgement (ACK)/negative acknowledgement (NAK) information for each respective downlink assignment of the first downlink assignments
receive from the UE second UCI for the second plurality of downlink assignments on a second PUCCH that is different than the first PUCCH, the second UCI comprising a second HARQ ACK/NACK information for each downlink assignment of the second plurality of downlink assignments wherein:
monitor for the first plurality of downlink assignments during a first monitoring window and monitoring for the second plurality of downlink assignments during a second monitoring window; and
transmit the first UCI comprising first HARQ ACK/NACK information for each respective downlink assignment of the first plurality of downlink assignments during the first monitoring window;
transmit the second UCI comprising second HARQ ACK/NACK information for each respective downlink assignment of the second plurality of downlink assignments during the second monitoring window.

21. The base station of claim 20 wherein:
the first UCI comprising the first HARQ ACK/NACK information for each respective downlink assignment of the first plurality of downlink assignments is received during a first monitoring window.

22. The base station of claim 21 wherein the one or more processors execute the instructions to: transmit, for each respective monitoring window of the first and second monitoring windows, a configuration of the respective monitoring window that configures the UE with the monitoring window using parameters that are based on a granularity, wherein the parameters comprise one or a combination of:
the value of the CORESET identity that the monitoring window applies to;
start;
end;
duration;
offset; and
periodicity.

23. The base station of claim 21, wherein the first UCI comprising the first HARQ ACK/NAK information for each respective downlink assignment of the first plurality of downlink assignments and the second UCI comprising the second HARQ ACK/NAK information for each respective downlink assignment of the second plurality of downlink assignments are transmitted in different occasions.

24. The base station of claim 23, wherein each occasion includes one of a slot, an OFDM symbol, or a group of OFDM symbols.

25. The base station of claim 20, wherein the CORESET having the CORESET identity of the first value is associated with a first transmit receive point (TRP), and the CORESET having the CORESET identity of the second value is associated with second TRP different than the first TRP.

* * * * *